US007150909B2

(12) United States Patent
Tani et al.

(10) Patent No.: US 7,150,909 B2
(45) **Date of Patent: *Dec. 19, 2006**

(54) ELECTROPHOTOGRAPHIC IMAGE-RECEIVING SHEET AND PROCESS FOR IMAGE FORMATION USING THE SAME

(75) Inventors: Yoshio Tani, Shizuoka (JP); Yoshisada Nakamura, Shizuoka (JP); Yasuo Sakaguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 246 days.

This patent is subject to a terminal disclaimer.

(21) Appl. No.: 10/417,213

(22) Filed: Apr. 17, 2003

(65) Prior Publication Data

US 2003/0224192 A1 Dec. 4, 2003

(30) Foreign Application Priority Data

Apr. 18, 2002 (JP) ............................ 2002-116871
Aug. 23, 2002 (JP) ............................ 2002-242872
Jan. 27, 2003 (JP) ............................ 2003-017268

(51) Int. Cl.

*B32B 27/06* (2006.01)
*B32B 27/10* (2006.01)
*B32B 27/20* (2006.01)
*B32B 27/36* (2006.01)
*B32B 37/04* (2006.01)

(52) U.S. Cl. .............................. 428/313.3; 428/195.1; 428/304.4; 428/318.4; 428/319.3; 428/323; 428/480; 428/481; 428/484; 428/485; 428/486; 399/130; 399/320; 399/328; 399/329; 430/110.1; 430/110.3; 430/110.4

(58) Field of Classification Search .................... None
See application file for complete search history.

(56) References Cited

U.S. PATENT DOCUMENTS

| | | | | | |
|---|---|---|---|---|---|
| 4,510,225 | A | * | 4/1985 | Kuehnle et al. | 430/126 |
| 5,370,963 | A | * | 12/1994 | Patel et al. | 430/137.14 |
| 5,460,874 | A | * | 10/1995 | Rao | 428/32.23 |
| 5,468,531 | A | * | 11/1995 | Kikukawa et al. | 428/36.5 |
| 5,641,568 | A | * | 6/1997 | Satoh et al. | 428/332 |
| 5,662,995 | A | * | 9/1997 | Sakurai et al. | 428/304.4 |
| 5,716,700 | A | * | 2/1998 | Kikukawa et al. | 428/339 |
| 5,759,672 | A | * | 6/1998 | Fujii et al. | 428/195.1 |
| 5,952,082 | A | * | 9/1999 | Normington et al. | 162/136 |
| 5,977,210 | A | * | 11/1999 | Patel et al. | 523/161 |
| 6,120,967 | A | * | 9/2000 | Hopper et al. | 430/137.14 |
| 6,210,853 | B1 | * | 4/2001 | Patel et al. | 430/137.14 |
| 6,280,830 | B1 | * | 8/2001 | Nakanishi et al. | 428/211.1 |
| 6,294,606 | B1 | * | 9/2001 | Chen et al. | 524/501 |
| 6,630,229 | B1 | * | 10/2003 | Normington et al. | 428/211.1 |

(Continued)

FOREIGN PATENT DOCUMENTS

JP 11-052606 A 2/1999

(Continued)

*Primary Examiner*—Vivian Chen
(74) *Attorney, Agent, or Firm*—Sughrue Mion, PLLC

(57) ABSTRACT

The present invention aims to provide an process for image formation using an electrophotographic image-receiving sheet having excellent anti-offset properties, adhesion resistance, paper transport properties and gloss, and being resistant to cracks, and able to form a high-definition image. For this purpose, there is provided an electrophotographic image-receiving sheet which includes a toner image-receiving layer containing at least a thermoplastic resin and natural wax having an light transmittance of 78% or less, on a support having an light transmittance of 30% or less, and an process for image formation using this electrophotographic image-receiving sheet.

24 Claims, 1 Drawing Sheet

U.S. PATENT DOCUMENTS

| | | | | |
|---|---|---|---|---|
| 6,720,064 | B1* | 4/2004 | Goto | 428/212 |
| 6,723,444 | B1* | 4/2004 | Kobayashi et al. | 428/480 |
| 6,743,502 | B1* | 6/2004 | Ogino et al. | 428/332 |
| 6,871,040 | B1* | 3/2005 | Tani et al. | 399/329 |
| 6,915,100 | B1* | 7/2005 | Tani et al. | 399/329 |
| 6,936,395 | B1* | 8/2005 | Goto et al. | 430/126 |
| 2002/0058130 | A1* | 5/2002 | Tateishi et al. | 428/195 |
| 2003/0180641 | A1* | 9/2003 | Nakajima et al. | 430/108.1 |
| 2003/0186061 | A1* | 10/2003 | Murata et al. | 428/421 |
| 2003/0207089 | A1* | 11/2003 | Nakamura et al. | 428/195.1 |
| 2003/0235683 | A1* | 12/2003 | Tamagawa et al. | 428/195.1 |
| 2006/0127651 | A1* | 6/2006 | Murata et al. | 428/195.1 |

FOREIGN PATENT DOCUMENTS

| | | |
|---|---|---|
| JP | 11-212292 A | 8/1999 |

* cited by examiner

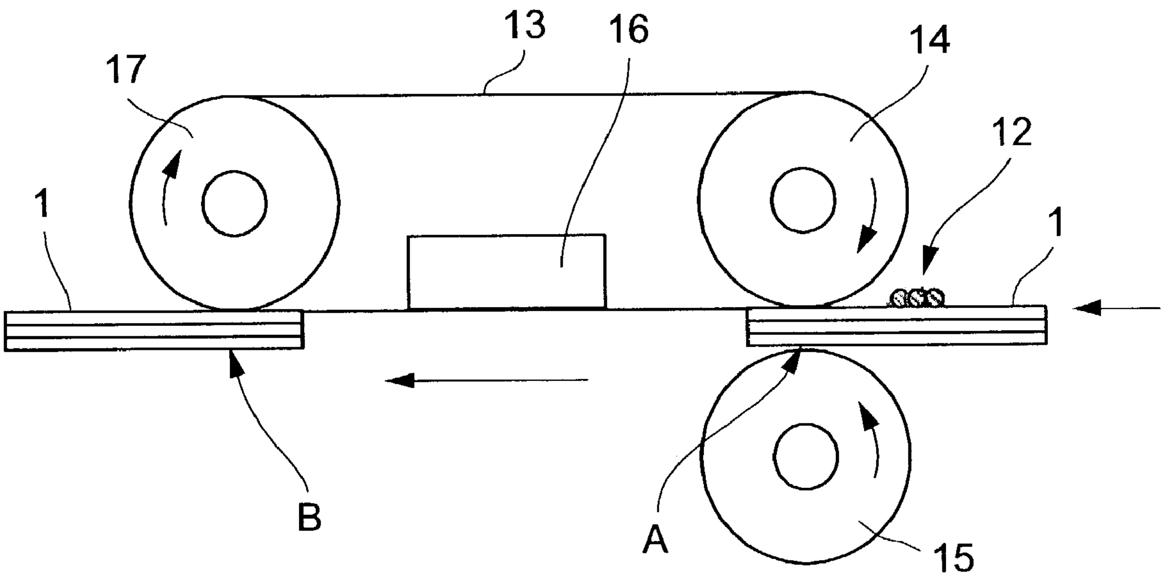
13
16
17
14
12
1
1
B
A
15

ELECTROPHOTOGRAPHIC IMAGE-RECEIVING SHEET AND PROCESS FOR IMAGE FORMATION USING THE SAME

BACKGROUND OF THE INVENTION

1. Field of the Invention

The present invention relates to an electrophotographic image-receiving sheet having excellent anti-offset properties, adhesion resistance, paper transport properties and gloss, and being resistant to cracks and able to form a high quality image, and to a process for image formation using the image-receiving sheet.

2. Description of the Related Art

As the printing speed of electrophotography is fast in dry processing and an image can be output on general-purpose paper (regular paper or high quality paper), it is used for copying machines or the output device of a personal computer. However, when image information such as a person's face or scene is output on the general-purpose paper, the texture is different from that of a photograph because of the general-purpose paper's poor gloss and different touching. Thus, a demand has been made on special paper which could be used in photographic applications has been required.

In response to the above demand, to obtain a special paper which does give outstanding gloss, an image-receiving sheet for electrophotography comprising a toner image-receiving layer containing a thermoplastic resin on a support has been proposed (for example, Japanese Patent Application Laid-Open (JP-A) No. 04-212168 and JP-A No. 08-211645). Specifically, to become closer to the photographic texture, JP-A No. 08-211645 discloses an image-receiving sheet for electrophotography using a support comprising a thermoplastic resin layer on both top and back surfaces of stencil paper.

In recent years, a technique has been disclosed wherein, by adding wax or a silicone compound to the toner, releasing properties are given to the heat roller of the fixing part, and an oil-less apparatus which does not use fixing oil and permits easy maintenance, is now coming into common use.

However, if an oil-less apparatus without fixing oil is used, the toner image-receiving layer containing the above thermoplastic resin is easily offset, and paper transporting may easily fail. For this reason, in JP-A No. 11-52604, JP-A No. 11-52605, JP-A No. 11-52606, and JP-A No. 11-212292, there is disclosed a technique using an additive having a releasing effect into the thermoplastic resin layer. However, the paper still shows poor gloss, and the texture is still largely different from that of a photograph.

SUMMARY OF THE INVENTION

It is therefore an object of the present invention to provide an electrophotographic image-receiving sheet having excellent anti-offset properties, adhesion resistance, paper transporting properties and gloss, and being resistant to cracks and able to form a high-quality image, and to an process for image formation using this electrophotographic image-receiving sheet.

The present invention provides, in a first aspect, an electrophotographic image-receiving sheet which comprises a support and a toner image-receiving layer disposed on the support, in which the toner image-receiving layer contains a thermoplastic resin and natural wax, the toner image-receiving layer has a light transmittance of 78% or less, and the support has a light transmittance of 30% or less.

The present invention also provides, in a second aspect, an electrophotographic image-receiving sheet which comprises a support and a toner image-receiving layer disposed on the support, in which the toner image-receiving layer contains a thermoplastic resin and a releasing agent having a melting point of 70° C. to 95° C., the toner image-receiving layer has a light transmittance of 78% or less, and the support has a light transmittance of 30% or less.

Due to the above structures, the electrophotographic image-receiving sheets according to the first aspect and second aspect have excellent anti-offset properties, adhesion resistance, paper transporting properties and gloss, and being resistant to cracks, and able to form a high quality image, even if an oil-less apparatus without fixing oil is used.

The present invention also provides a process for image formation which includes the step of forming a toner image on a surface of the electrophotographic image-receiving sheet of the present invention, the step of heating and pressurizing the surface of the electrophotgrahic image-receiving sheet with a fixing belt and a roller, and the step of cooling the surface, so as to separate the surface from the fixing belt.

With the process, separation of the electrophotographic image-receiving sheet and toner is prevented, and offset of the electrophotographic image-receiving sheet and toners are prevented, even if an oil-less apparatus without fixing oil is used. Moreover, a stable paper feed can be achieved, and a high quality image with high gloss and a rich photographic texture can be obtained.

BRIEF DESCRIPTION OF THE DRAWING

FIGURE is a schematic view showing an example of an apparatus for electrophotography having a fixing belt according to the present invention.

DESCRIPTION OF THE PREFERRED EMBODIMENTS (Electrophotographic Image-receiving Sheet)

The image-receiving sheet for electrophotography of the present invention comprises a support and a toner image-receiving layer disposed on at least one surface of the support, and other layers suitably chosen as necessary, for example, a protective layer, intermediate layer, an intermediate layer, an undercoat, a cushion layer, a charge control (antistatic) layer, a reflective layer, a color tint adjustment layer, a storability improvement layer, an anti-adhesion layer, an anticurl layer and a smoothing layer. These layers may have a single-layer structure or a laminated-layer structure.

[Support]

From the viewpoint of giving more photographic texture to the electrophotographic image-receiving sheet of the present invention, the support is required to have a low light transmittance of 30% or less. The light transmittance is preferably 20% or less and more preferably 15% or less.

The light transmittance can be measured by a direct-reading haze meter (HGM-2DP produced by Suga Test Instruments Co., Ltd.).

The support preferably has a center line average roughness of 0.01 μm to 5 μm on a surface thereof, and more preferably 0.05 μm to 3 μm on a surface thereof.

By adjusting the center line average roughness within the above numerical range, an electrophotographic image-receiving sheet with outstanding characteristics, such as paper transporting properties, can be provided.

There is no particular limitation on the support which can be suitably selected according to the purpose. Examples of the support include raw paper, synthetic paper, synthetic resin sheet, coated paper, laminated paper, and the like. These supports may have a single-layer structure, or a laminated layer structure in which two or more layers are disposed.

Raw Paper

The materials of the raw paper (including synthetic paper) may be those types of raw paper used as supports in the art, which can be selected from various kinds of materials without any particular limitation. Examples of the materials of the raw paper include natural pulp selected from needle-leaf trees and broadleaf trees, synthetic pulp made from plastics materials such as polyethylene, polypropylene, or the like, a mixture of the natural pulp and the synthetic pulp, and the like.

Regarding pulps used as materials for raw paper, from the viewpoint of good balance between surface flatness and smoothness of the raw paper, rigidity and dimensional stability (curl), broadleaf tree bleached kraft pulp (LBKP) is preferred. Needle-leaf bleached kraft pulp (NBKP), broadleaf tree sulfite pulp (LBSP), and the like can also be used.

Regarding the pulp fiber, it is appropriate to use mainly broadleaf pulp having short fiber length.

A beater or a refiner, or the like, can be used for beating the pulp. Various additives, for example, fillers, dry paper reinforcers, sizing agents, wet paper reinforcers, fixing agents, pH regulators or other agents, or the like may be added, if necessary, to the pulp slurry (hereafter, may be referred to as pulp paper material) which is obtained after beating the pulp.

Examples of the fillers include calcium carbonate, clay, kaolin, white clay, talc, titanium oxide, diatomaceous earth, barium sulfate, aluminum hydroxide, magnesium hydroxide, and the like.

Examples of dry paper reinforcers include cationic starch, cationic polyacrylamide, anionic polyacrylamide, amphoteric polyacrylamide, carboxy-modified polyvinyl alcohol, and the like.

Examples of sizing agents include a compound and the like which contains rosin derivatives such as aliphatic salts, rosin, maleic rosin or the like; paraffin wax, alkyl ketene dimer, alkenyl succinic anhydride (ASA), epoxy aliphatic amide, and the like.

Examples of the wet paper reinforcers include polyamine polyamide epichlorohydrin, melamine resin, urea resin, epoxy polyamide resin, and the like.

Examples of the fixing agents include polyfunctional metal salts such as aluminum sulfate, aluminum chloride, or the like; cationic polymers such as cationic starch, or the like.

Examples of the pH regulators include caustic soda, sodium carbonate, and the like. Examples of other agents include defoaming agents, dyes, slime control agents, fluorescent whitening agent s, and the like.

Moreover, softeners can also be added if necessary. An example of the softeners is indicated on pp. 554–555 of *Paper and Paper Treatment Manual* (Shiyaku Time Co.) (1980).

Treatment liquids used for sizing a surface include water-soluble polymers, waterproof materials, pigments, dyes, fluorescent whitening agents, and the like. Examples of water-soluble polymers include cationic starch, polyvinyl alcohol, carboxy-modified polyvinyl alcohol, carboxymethylcellulose, hydroxyethylcellulose, cellulose sulfite, gelatin, casein, sodium polyacrylate, styrene-maleic anhydride copolymer sodium salt, sodium polystyrene sulfonate, and the like.

Examples of the waterproof materials include latex emulsions such as styrene-butadiene copolymer, ethylene-vinyl acetate copolymer, polyethylene, vinylidene chloride copolymer or the like; polyamide polyamine epichlorohydrin, and the like.

Examples of the pigments include calcium carbonate, clay, kaolin, talc, barium sulfate, titanium oxide, and the like.

Examples of the raw paper materials include the natural pulps, synthetic pulp paper, mixtures of the natural pulp and the synthetic pulp, various types of composite paper, and the like.

As for the above raw paper, to improve the rigidity and dimensional stability (curl) of the electrophotographic image-receiving paper, it is preferred that the ratio (Ea/Eb) of the longitudinal Young's modulus (Ea) and the lateral Young's modulus (Eb) is within the range of 1.5 to 2.0. If the Ea/Eb value is less than 1.5 or more than 2.0, the rigidity and curl of the electrophotographic image-receiving paper tend to deteriorate, and may interfere with paper when transported.

In the present invention, the Oken type smoothness of a surface of the toner image-receiving layer of the raw paper is 210 seconds or more, and preferably 250 seconds or more. If the Oken type smoothness is less than 210 seconds, the quality of the toner image is poor. There is no particular limitation on the upper limit. However, in practice, about 600 seconds, and preferably about 500 seconds are suitable.

The present invention solves various problems by adopting a Oken type smoothness of 210 seconds or more which is far larger than the Oken type smoothness adopted in the related art.

Here, the Oken type smoothness refers to the smoothness specified by the JAPAN TAPPI No. 5 B method.

It has been found that in general, the "tone" of the paper differs based on differences in the way the paper is beaten, and the elasticity (modulus) of paper from paper-making after beating can be used as an important indication of the "tone" of the paper.

The elastic modulus of the paper can be calculated from the following equation by using the relation of the density and the dynamic modulus which shows the physical properties of a viscoelastic object, and by measuring the velocity of sound propagation in the paper using an ultrasonic oscillator.

$$E=\rho c^2(1-n^2)$$

[E=dynamic modulus, ρ=density, c=velocity of sound in paper, n=Poisson's ratio]

As n=0.2 or so in a case of ordinary paper, there is not much difference in the calculation, even if the calculation is performed by the following equation:

$$E=\rho c^2$$

Namely, if the density of the paper and acoustic velocity can be measured, the elastic modulus can easily be calculated. In the above equation, when measuring acoustic velocity, various instruments known in the art may be used, such as a Sonic Tester SST-110 (Nomura Shoji Co., Ltd.) or the like.

The thickness of the raw paper is preferably 30 μm to 500 μm, and more preferably 50 μm to 300 μm, and still more preferably 100 μm to 250 μm. The weighting of the raw paper is for example preferably 50 g/$m^2$ to 250 g/$m^2$, and more preferably 100 g/$m^2$ to 200 g/$m^2$.

Specifically, the raw paper may be a high quality paper, for example, the paper described in *Basic Photography Engineering—Silver Halide Photography*, CORONA PUBLISHING CO., LTD. (1979) pp. 223–240, edited by the Institute of Photography of Japan.

In the raw paper, it is preferred to use pulp fibers having a fiber length distribution as disclosed, for example, in Japanese Patent Application Laid-Open (JP-A) No. 58-68037 (for example, the sum of 24-mesh screen residue and 42-mesh screen residue is 20% by mass to 45% by mass, and 24-mesh screen residue is 5% by mass or less) in order to give the desired center line average roughness to the surface. Moreover, the center line average roughness can be adjusted by heating and giving a pressurize to a surface of the raw paper, with a machine calendar, super calendar, or the like.

Synthetic Resin Sheet

The synthetic resin sheet may be a synthetic resin formed in the shape of a sheet (film). The synthetic resin sheet may for example be obtained by extruding polyolefin resin such as polypropylene resin or the like, or polyester resins such as polyethylene-terephthalate resin, or the like, into a shape of a sheet.

Coated Paper

The coated paper is paper or a sheet on one-side or both sides of which rubber latex, polymer materials, or the like is coated. The amount to be coated differs according to the use. Examples of the coated paper include art paper, cast coated paper, Yankee paper, and the like.

If a resin is used to coat the surface of raw paper, for example, it is appropriate to use a thermoplastic resin. Examples of the thermoplastic resins include the thermoplastic resins of the following (a) to (h).

(a) Polyolefin resins such as polyethylene resin, polypropylene resin, or the like; copolymer resins of an olefin such as ethylene or propylene with other vinyl monomers; acrylic resins, and the like.

(b) Thermoplastic resins containing at least an ester bond. For example, polyester resins obtained by condensation of dicarboxylic acid components (these dicarboxylic acid components may be substituted by a sulfonic acid group, a carboxyl group, and the like.) and alcoholic components (these alcoholic components may be substituted by the hydroxyl group, and the like), polyacrylic acid ester resins or polymethacrylic acid ester resins such as polymethylmethacrylate, polybutylmethacrylate, polymethylacrylate, polybutylacrylate, and the like; polycarbonate resin, polyvinyl acetate resin, styrene acrylate resin, styrene-methacrylic acid ester copolymer resin, vinyltoluene acrylate resin, and the like.

Specifically, the resins described in JP-A Nos. 59-101395, 63-7971, 63-7972, 63-7973, 60-294862, or the like may be mentioned.

Examples of commercial products include Bailon 290, Bailon 200, Bailon 280, Bailon 300, Bailon 103, Bailon GK-140 and Bailon GK-130 from Toyobo Co., Ltd; Tufton NE-382, Tufton U-5, ATR-2009 and ATR-2010 from Kao Corporation; Eritel UE3500, UE3210, XA-8153, KZA-7049 and KZA-1449 from Unitika Ltd.; polyester-TP-220 and R-188 from The Nippon Synthetic Chemical Industry Co., Ltd.; and thermoplastic resins in the high loss series from SEIKO CHEMICAL INDUSTRIES CO., LTD., and the like.

(c) Polyurethane resins, and the like.

(d) Polyamide resins, urea resins, and the like.

(e) Polysulfone resins, and the like.

(f) Polyvinyl chloride resin, polyvinylidence chloride resin, vinyl chloride-vinyl acetate-copolymer resin, vinyl chloride-vinyl propionate copolymer resin, and the like.

(g) Polyol resins such as polyvinyl butyral, and cellulose resins such as ethyl cellulose resin and cellulose acetate resin.

(h) Polycaprolactone resin, styrene-maleic anhydride resin, polyacrylonitrile resin, polyether resins, epoxy resins, phenol resins, and the like.

One of the thermoplastic resins may be used either alone or in combination of two or more.

A thickness of the thermoplastic resin layer is preferably 5 μm to 100 μm, and more preferably 15 μm to 50 μm. A thermoplastic resin layer disposed on a surface of paper and a thermoplastic resin layer disposed on a back surface of the paper may have either the same or different components, physical properties, thickness, and structure.

Laminated Paper

The laminated paper comprises various kinds of sheets, films, or layers of resins, rubber, polymer, or the like on a sheet such as raw paper or the like. Examples of laminating materials (resins, rubber, polymer, or the like) include polyolefin, polyvinyl chloride, polyethylene terephthalate, polystyrene, polymethacrylate, polycarbonate, polyimide, triacetyl cellulose, and the like. These resins may be used either alone or in combination of two or more.

The polyolefin is generally formed using a low density polyethylene. In order to improve the heat-resistance properties of the support, it is preferred to use polypropylene, a blend of polypropylene and polyethylene, high density polyethylene, a blend of high density polyethylene and low density polyethylene, or the like. From the viewpoints of cost and suitability for lamination, it is most preferred to use the blend of high density polyethylene and low density polyethylene.

The blend of high density polyethylene and low density polyethylene is used in a blending ratio (mass ratio) of, for example, 1/9 to 9/1. This blending ratio is preferably 2/8 to 8/2, and more preferably 3/7 to 7/3. When disposing a thermoplastic resin layer on both sides of the support, it is preferred to use high density polyethylene, or the blend of high density polyethylene and low density polyethylene, on the back surface of the support. There is no particular limitation on the molecular weight of polyethylene. However, it is preferred that the melt index is within 1.0 g/10 minutes to 40 g/10 minutes for both high density polyethylene and low density polyethylene, and is preferred that it has extrusion suitability.

In addition, a treatment may be performed to confer white reflective properties on these sheets or films. An example of such a treatment method is to blend a pigment such as titanium oxide or the like into these sheets or films.

The resin used for coating or laminating is not limited to a thermoplastic resin. Examples of the resins for coating or laminating further include resin in which monomer or thermoplastic resin is reacted with light, hardeners, cross-linking agents, or the like, thermocuring resin, and the like.

At least one layer of the coating or laminated resin layers may be a monomer containing a photopolymerization initiator, or may be a resin composition cured by UV irradiation. The resin composition may in this case contain an electron beam-hardening organic compound as a main component. There is no particular limitation on the type of this electron-beam hardening organic compound, which may be a monomer or an oligomer. These may be used either alone or in combination of two or more.

The electron-beam hardening unsaturated compound may for example be selected from the following compounds.

(1) Acrylate compounds of aliphatic, alicyclic or aromatic-aliphatic monovalent to sixvalent alcohols and polyalkylene glycols.

(2) Acrylate compounds obtained by adding alkylene oxides to aliphatic, alicyclic or aromatic-aliphatic monovalent to sixvalent alcohols (3) Polyacryloylalkyl phosphate esters (4) Reaction products of carboxylic acids, polyols, and acrylic acid (5) Reaction products of isocyanates, polyols, and acrylic acid (6) Reaction products of epoxy compounds and acrylic acid (7) Reaction products of epoxy compounds, polyols, and acrylic acid Examples of these compounds, or specifically, examples of the electron-beam hardening unsaturated organic compound, include polyoxyethylene epichlorohydrin-modified bisphenol A diacrylate, dicyclohexyl acrylate, epichlorohydrin-modified polyethylene glycol diacrylate, 1,6-hexanediol diacrylate, hydroxybivaric acid ester neopentyl glycol diacrylate, nonyl phenoxypolyethylene glycol acrylate, ethylene oxide-modified phenoxyic phosphoric acid acrylate, ethylene oxide-modified phthalic acid acrylate, polybutadiene acrylate, caprolactam-modified tetrahydrofurfuryl acrylate, tris(acryloxyethyl) isocyanate, trimethylol-propane triacrylate, pentaerythritol triacrylate, pentaerythritol tetraacrylate, pentaerythritol penta-acrylate, dipentaerythritol hexaacrylate, polyethylene glycol diacrylate, 1,4-butadiene diol diacrylate, neopentyl glycol diacrylate, neo pentyl glycol-modified trimethylolpropane diacrylate, and the like.

According to the present invention, these organic compounds may be used either alone or in combination of two or more.

Regarding the coating or laminated resin layer, there is no particular limitation on the type of UV radiation hardening organic compound which becomes cured by UV irradiation. The UV radiation hardening resin composition may be prepared by adding a suitable amount of the photopolymerization initiator to the electron-beam hardening resin. The resin composition used for electron-beam hardening may or may not contain a photopolymerization initiator, and it is preferable to use it to the extent that it does not generate odor.

Regarding the coating or laminated resin layer, there is no particular limitation on the type of UV radiation hardening organic compound which becomes cured by UV irradiation. This UV radiation hardening resin composition may be prepared by adding a suitable amount of the photopolymerization initiator to the electron-beam hardening resin. According to the present invention, the resin composition used for electron-beam hardening may or may not contain a photopolymerization initiator, and it is preferable to use it to the extent that it does not generate an odor.

The amount to add the photopolymerization initiator is preferably 0.1% by mass to 10% by mass relative to the mass of UV radiation hardening resin. The concurrent use of photopolymerization promoters known in the art such as N-methyldiethanolamine, bis-diethyl aminobenzophenone, or the like together with the photopolymerization initiator is preferred to improve the curing rate. There is no particular limitation on the amount to add the photopolymerization promoter as long as it has a positive effect. However, it is generally preferred to be 0.5 times to 2 times more than the mass of photopolymerization initiator.

There is no particular limitation on the electron-beam accelerator used for the electron beam irradiation. Example of the electron-beam accelerator include the electron beam irradiation device such as a Van der Graaf scanning type, a double scanning type, a curtain beam type, or the like.

There is no particular limitation on the ultraviolet irradiation device used for the UV irradiation. Examples of the ultraviolet irradiation device include a low-pressure mercury lamp, medium pressure mercury lamp, high-pressure mercury lamp, metal halide lamp, and the like.

The support may have a desired laminated structure of the various kinds of support mentioned above.

Methods for coating resin or the like on the raw paper or the like include coating, impregnating, or spraying a resin solution or suspension onto the raw paper.

To improve adhesion of the resin to be coated on the raw paper, it is preferred to give one or both surfaces of the raw paper an activation treatment, such as corona discharge treatment, flame treatment, glow discharge treatment or the like, or plasma treatment, prior to coating or laminating the resin.

A surface treatment such as corona discharge treatment may be given to the raw paper, the synthetic paper or synthetic resin sheet, or after disposing a coating layer or laminated layer thereon, or an undercoat may be applied to the surface, to improve the adhesion of the upper layer, for example, the toner image-receiving layer.

In addition, the surface of the thermoplastic resin layer used for the coated paper may, if necessary, be given a gloss finish, or a fine finish, matt finish or grainy finish as described in JP-A No. 55-26507, or a non-gloss finish may if necessary be given to the surface of the thermoplastic resin layer on the opposite side (back surface) to the surface on which the electroconducting layer is disposed. Further, activation such as corona discharge treatment or flame treatment can be applied to these surfaces after giving them a finish. Any known undercoating-treatment may also be given to these surfaces after activation.

These treatments may be carried out either alone, or in a desirable combination of two ore more treatments. The desirable combination includes subjecting the surface of the layer to activation after shaping or the like, providing under-coating after the activation, and the like.

Suitable additives may be used to the thermal plastic resin layer or the like, as long as it does not affect the objects of the present invention.

The thickness of the support is preferably 25 μm to 300 μm, more preferably 50 μm to 260 μm, and still more preferably 75 μm to 220 μm. Supports having various rigidity may be used according to the purpose. It is preferred that the support used for electrophotographic image-receiving sheets of photographic image quality is close to the support used for color film photos.

From the viewpoint of fixing performance, it is preferred that the thermal conductivity of the support under the condition of 65% of relative humidity at 20° C. is, for example, 0.50 kcal/m·h·° C., or more. Here, thermal conductivity can be measured on a humidified transferring paper supported on JIS P 8111 by the process disclosed in JP-A No. 53-66279. It is also preferred from the above viewpoint, that the density of this support is 0.7 g/cm$^3$ or more.

Various kinds of additives, suitably selected as long as it does not adversely affect the objects of the present invention, can be blended into the support. Examples of the additives include whiteners, conductive agents, fillers, titanium oxide, ultramarine blue, pigments such as carbon black, or the like.

Hydrophilic binders, alumina sol, semiconducting metal oxides such as tin oxide, and carbon black or other antistatic agents may be blended with the support, or coated on its surface or back surface, or both of the surfaces. Specifically, the support disclosed in JP-A No. 63-220246 may be used. It is preferred that this support can withstand the fixing temperature, and can satisfy requirements regarding whiteness degree, slipping properties, frictional properties, antistatic properties, depression after fixing, and the like.

[Toner Image-receiving Layer]

The above-mentioned toner image-receiving layer is a toner image-receiving layer for receiving a color toner or a black toner and for forming an image. The toner image-receiving layer works as receiving toner which forms an image on a developing drum or an intermediate transfer member, using electricity, electrostaticity or pressure in a transferring step, and fix the image by heat or pressure in a fixing step.

To give the toner image-receiving layer of the present invention a texture close to that of a photograph, it has a low light transmittance of preferably 78% or less, more preferably 73% or less and still more preferably 72% or less.

The light transmittance of the toner image-receiving layer can be measured by using a direct-reading haze meter (Suga Test Instruments HGM-2DP). The light transmittance of the toner image-receiving layer can be measured by measuring a coating film which serves as the toner image-receiving layer and is as thick as the toner image-receiving layer, formed on a 100 μm thick polyethylene terephthalate film.

Regarding the material of the above-mentioned toner image-receiving layer, the following first aspect and second aspect may be mentioned. The first aspect provides the toner image-receiving layer which contains a thermoplastic resin and natural wax, and also contains a colorant as well as other components, if necessary. The second aspect provides the toner image-receiving layer which contains a thermoplastic resin and a releasing agent having a melting point of 70° C. to 95° C., and also contains a colorant as well as other components, if necessary.

Thermoplastic Resin

There is no particular limitation on the above-mentioned thermoplastic resin. The thermoplastic resin may be selected according to the purpose, as long as it can be modified at the fixing temperature and can receive toner. The thermoplastic resin is preferably the same as the binder resin of the toner. Many of the toners contain polyester resin, styrene, a copolymer resin such as styrene-butylacrylate, or the like. In this case, it is preferable to use a polyester resin, styrene or a copolymer resin such as styrene-butylacrylate or the like also as the thermoplastic resin used for the electrophotographic image-receiving sheet. It is more preferable to use 20% by mass or more of the polyester resin, styrene or copolymer resin such as styrene-butylacrylate. Styrene, styrene-butylacrylate copolymer, styrene-acrylic ester copolymer and styrene-methacrylic ester copolymer are also preferred.

Specific examples of the thermoplastic resin include (a) resins containing ester bonds, (b) polyurethane resins or the like, (c) polyamide resins or the like, (d) polysulfone resins or the like, (e) polyvinyl chloride resins or the like, (f) polyvinyl butyral or the like, (g) polycaprolactone resins, and (h) polyolefin resins, and the like.

Examples of (a) resins containing ester bonds include polyester resins obtained by condensation of a dicarboxylic acid component with an alcohol component.

Specific examples of the dicarboxylic acid component include terephthalic acid, isophthalic acid, maleic acid, fumaric acid, phthalic acid, adipic acid, sebacic acid, azelaic acid, abietic acid, succinic acid, trimellitic acid, pyromellitic acid, and the like. The dicarboxylic acid components may be substituted with the sulfonic acid group and a carboxyl group or the like.

Specific examples of the alcohol component include ethylene glycol, diethylene glycol, propylene glycol, bisphenol A, diether derivative of bisphenol A such as ethyleneoxide diaddition product of bisphenol A, propylene oxide diaddition product of bisphenol A, or the like), bisphenol S, 2-ethyl cyclohexyl dimethanol, neopentyl glycol, cyclohexyldimethanol, glycerol, and the like. The alcohol component may be substituted with a hydroxyl group, or the like.

The examples of (a) resins containing ester bonds further include polyacrylic ester resins or polymethacrylic acid ester resins such as polymethylmethacrylate, polybutylmethacrylate, polymethyl acrylate, polybutylacrylate, or the like; polycarbonate resins, polyvinyl acetate resins, styrene acrylate resins, styrene-methacrylic ester copolymer resin, vinyltoluene acrylate resin, and the like.

Specific examples can be found in Japanese Patent Application Laid-Open (JP-A) Nos. 59-101395, 63-7971, 63-7972, 63-7973 and 60-294862.

Commercial products of the above-mentioned polyester resins include Bylon 290, Bylon 200, Bylon 280, Bylon 300, Bylon 103, Bylon GK-140 and Bylon GK-130 from Toyobo Co., Ltd; Tufton NE-382, Tufton U-5, ATR-2009 and ATR-2010 from Kao Corporation; Eritel UE3500, UE3210 and XA-8153 from Unitika, Ltd; Polyester TP-220, R-188 from The Nippon Synthetic Chemical Industry Co., Ltd., and the like.

Commercial products of the above-mentioned acrylic resins include SE-5437, SE-5102, SE-5377, SE-5649, SE-5466, SE-5482, HR-169, HR-124, HR-1127, HR-116, HR-113, HR-148, HR-131, HR-470, HR-634, HR-606, HR-607, LR-1065, LR-574, LR-143, LR-396, LR-637, LR-162, LR-469, LR-216, BR-50, BR-52, BR-60, BR-64, BR-73, BR-75, BR-77, BR-79, BR-80, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 from Mitsubishi Rayon Ltd.; Esrec P SE-0020, SE-0040, SE-0070, SE-0100, SE-1010, SE-1035 from Sekisui Chemical Co., Ltd.; Himer ST95 and ST120 from Sanyo Chemical Industries, Ltd.; and FM601 from Mitsui Chemicals, Inc.

The polyvinyl chloride resin (e) mentioned above may for example include a polyvinylidene chloride resin, vinyl chloride-vinyl acetate copolymer resin, vinyl chloride-propionic acid vinyl copolymer resin, and the like.

The polyvinyl butyral (f) mentioned above may include a cellulose resin such as a polyol resin, ethyl cellulose resin, cellulose acetate resin, and the like. Commercial products thereof include those produced by Denki Kagaku Kogyo Kabushiki Kaisha, Sekisui Chemicals Ltd., or the like. The polyvinyl butyral preferably contains 70% by mass or more of polyvinyl butyral, and preferably has an average polymerization degree of 500 or more, but more preferably an average polymerization degree of 1000 or more. Commercial products thereof include Denka Butyral 3000-1, Denka Butyral 4000-2, Denka Butyral 5000A and Denka Butyral 6000C from Denki Kagaku Kogyo Kabushiki Kaisha; and Esrec BL-1, BL-2, BL-3, BL-S, BX-L, BM-1, BM-2, BM-5, BM-S, BH-3, BX-1, BX-7 from Sekisui Chemicals Ltd., and the like.

Examples of the polycaprolactone resin (g) include styrene-maleic anhydride resin, polyacrylonitrile resin, polyether resins, epoxy resins, phenol resins.

Examples of the polyolefin resin (h) are polyethylene resin and polypropylene resin, copolymer resins of olefins such as ethylene and propylene with other vinyl monomers, and acrylic resins.

These thermoplastic resins can be used either alone or in combination of two or more. Mixtures or copolymers thereof can also be used.

It is preferred that the thermoplastic resin satisfies the physical properties of the toner image-receiving layer when the toner image-receiving sheet is formed. It is more preferred that it satisfies the physical properties of the toner image-receiving layer when the resin is used alone. It is also preferred that two or more resins giving different physical properties to the toner image-receiving layer are used in combination.

It is preferred that the thermoplastic resin has a larger molecular weight than that of the thermoplastic resin used for the toner. However, this molecular weight relation may not always be desirable depending on the thermodynamic properties of the thermoplastic resin used for the toner and the resin used for the toner image-receiving layer. For example, if the softening temperature of the resin used for the toner image-receiving layer is higher than that of the thermoplastic resin used for the toner, it is preferred that the molecular weights are identical, or that the molecular weight of the resin used for the toner image-receiving layer is smaller.

It is preferred that the thermoplastic resin used is a mixture of resins with identical compositions having different average molecular weights. The relation of molecular weights of thermoplastic resins used as toners is disclosed in JP-A No. 08-334915.

The molecular weight distribution of the thermoplastic resin is preferably wider than the molecular weight distribution of the thermoplastic resin used in the toner.

It is preferred that the thermoplastic resin satisfies the physical properties disclosed in Japanese Patent Application Publication (JP-B) No. 05-127413, JP-A Nos. 08-194394, 08-334915, 08-334916, 09-171265, 10-221877, and the like.

Due to the reasons (i) and (ii) below, it is particularly preferred that the thermoplastic resin used in the toner image-receiving layer is an aqueous resin such as a water-soluble resin or water-dispersible resin.

(i) there is no discharge of organic solvent in the coating and drying steps, which is excellent for the environment and provides easy working.

(ii) many releasing agents such as wax are difficult to soluble in solvents at room temperature. Therefore, the releasing agents are often dispersed in a solvent (water, organic solvent) in advance. If they are dispersed in water, they are stable and highly suited to manufacturing steps. Further, if they are applied in an aqueous form, the wax easily bleeds on the surface in the coating and drying steps, and it is easy to obtain a releasing agent effect (anti-offset properties, adhesion-resistance, and the like).

As long as it is a water-soluble resin or water-degradable resin, the aqueous resin may have any composition, bond structure, molecular structure, molecular weight, molecular weight distribution or formation.

Examples of polymer groups which confer aqueous affinity include a sulfonyl group, a hydroxyl group, a carboxyl group, an amino group, an amide group, an ether group, and the like.

Examples of the water-soluble resins are given on page 26 of *Research Disclosure* No. 17,643, page 651 of *Research Disclosure* No. 18,716, pp 873–874 of *Research Disclosure* Nos. 307,105 and pp 71–75 of JP-A No. 64-13546.

Specific examples include a vinyl pyrrolidone-vinyl acetate copolymer, styrene-vinyl pyrrolidone copolymer, styrene-maleic anhydride copolymer, water-soluble polyester, water-soluble acryl, water-soluble polyurethane, water-soluble nylon, a water-soluble epoxy resin, and the like. Moreover, various types of gelatins may be selected according to the purpose from liming gelatin, acid-treated gelatin and deliming gelatin wherein the content of calcium, or the like is reduced, and it is also preferable to use these in combination. Examples of water-soluble polyesters are various plus coats from GaO Chemical Industries and the FineTex ES series from Dainippon Ink and Chemicals, Incorporated. Examples of the water-soluble acryls include the Julimer AT series from NIHON JUNYAKU CO., LTD., FineTex 6161 and K-96 from Dainippon Ink and Chemicals, Incorporated, and High Loss NL-1189 and BH-997L from SEIKO CHEMICAL INDUSTRIES CO., LTD.

Examples of water-dispersible resins include water-dispersible type resins such as water-dispersible acrylate resin, water-dispersible polyester resin, water-dispersible polystyrene resin, water-dispersible urethane resin, or the like; and emulsions such as acrylic resin emulsion, polyvinyl acetate emulsion, SBR (styrene butadiene) emulsion, or the like. The resin can be suitably selected from an aqueous dispersion of the thermoplastic resins (a) to (h), emulsions thereof, or copolymers thereof, mixtures and cation-modified, or the like. Two or more of these sorts can be combined.

Examples of the water-dispersible resins in the polyester class are the Byronal series from Toyobo Co., Ltd, the Pethregin A series from TAKAMATSU OIL& FAT CO., LTD, the Tufton UE series from Kao Corporation, the Japan Synthetic Polyester WR series, the Aeriel series from Unitika Ltd., and the like. Examples in the acrylic class include the High Loss XE, KE and PE series from SEIKO CHEMICAL INDUSTRIES CO., LTD., the Julimer ET series from NIHON JUNYAKU CO., LTD., and the like.

It is preferred that the film-forming temperature (MFT) of the polymer is more than room temperature for storage before printing, and is 100° C. or lower for fixing of toner particles.

It is desirable to use a self-dispersing water-dispersible polyester resin emulsion satisfying the following characteristics (1) to (4) as the above-mentioned thermoplastic resin. As this is a self-dispersing type which does not use a surfactant, its hygroscopicity is low even in a high humidity environment, its softening point is not much reduced by moisture, and offset produced during fixing, or sticking of sheets in storage, can be suppressed. Moreover, since it is an aqueous system, it is very environment-friendly and has excellent workability. As it uses a polyester resin which easily assumes a molecular structure with high cohesion energy, it has sufficient hardness in a storage environment, assumes a melting state of low elasticity (low viscosity) in the electrophotographic fixing step, and toner is embedded in the image-receiving layer so that a sufficiently high image quality is attained.

(1) The number average molecular weight (Mn) is preferably 5000 to 10000, and more preferably 5000 to 7000.

(2) The molecular weight distribution (Mw/Mn) (weight average molecular weight/number average molecular weight) is preferably 4 or less, and more preferably 3 or less.

(3) The glass transition temperature (Tg) is preferably 40° C. to 100° C., and more preferably 50° C. to 80° C.

(4) The volume average particle diameter is preferably 20 nm to 200 nm, and more preferably 40 nm to 150 nm.

A content of the thermoplastic resin in the toner image-receiving layer is preferably 10% by mass or more, and more preferably 30% by mass or more.

Natural Wax

It is preferred that the toner image-receiving layer contains natural wax as a releasing agent from a viewpoint of providing an electrophotographic image-receiving sheet having excellent anti-offset properties, adhesion resistance, paper transport properties and gloss, and being resistant to cracks and able to form a high quality image.

The natural wax is preferably selected from vegetable wax, mineral wax, petroleum wax, and the like. Of these, the vegetable wax is preferred. A preferable example of the natural wax includes water-dispersed wax, from a viewpoint of compatibility with solution, when a hydrogetic thermoplastic resin is used as the thermoplastic resin in the toner image-receiving layer.

Examples of the vegetable wax include carnauba wax (for example, EMUSTAR AR-0413 from Nippon Seiro Co., Ltd., and Cellusol 524 from Chukyo Yushi Co., Ltd.), castor oil (purified castor oil from Itoh Oil Chemicals Co., Ltd.), rapeseed oil, soybean oil, Japan tallow, cotton wax, rice wax, sugarcane wax, candellila wax, Japan wax, jojoba oil, and the like.

Of these, carnauba wax having a melting point of 70° C. to 95° C. is particularly preferable from viewpoints of providing an electrophotographic image-receiving sheet which is excellent in anti-offset properties, adhesive resistance, paper transporting properties, gloss, is less likely to cause crack and splitting, and is capable of forming a high quality image.

Examples of animal wax are bees wax, lanolin, spermaceti, whale oil, wool wax, and the like.

Examples of the mineral wax include natural wax such as montan wax, montan ester wax, ozokerite, ceresin, and the like; aliphatic acid esters (Sansosizer-DOA, AN-800, DINA, DIDA, DOZ, DOS, TOTM, TITM, E-PS, nE-PS, E-PO, E-4030, E-6000, E-2000H, E-9000H, TCP, C-1100, and the like, from New Japan Chemical Co., Ltd.), and the like. Of these, montan wax having a melting point of 70° C. to 95° C. is particularly preferable from viewpoints of providing an electrophotographic image receiving sheet which is excellent in anti-offset properties, adhesive resistance, paper transporting properties, gloss, is less likely to cause crack and splitting, and is capable of forming a high quality image.

Examples of the petroleum wax are paraffin wax (for example, Paraffin wax 155, Paraffin wax 150, Paraffin wax 140, Paraffin wax 135, Paraffin wax 130, Paraffin wax 125, Paraffin wax 120, Paraffin wax 115, HNP-3, HNP-5, HNP-9, HNP-10, HNP-11, HNP-12, HNP-14 g, SP-0160, SP-0145, SP-1040,-SP-1035, SP-3040, SP-3035, NPS-8070, NPS-L-70, OX-2151, OX-2251, EMUSTAR-0384 and EMUSTAR-0136 from Nippon Oils and Fats Co., Ltd.; Cellosol 686, Cellosol 428, Cellosol 651-A, Cellosol A, H-803, B-460, E-172, E-866, K-133, hydrin D-337 and E-139 from Chukyo Oils and Fats Co., Ltd.; 125 paraffin, 125° FD, 130° paraffin, 135° paraffin, 135° H, 140° paraffin, 140° N, 145° paraffin and paraffin wax M from Nippon Oil Corporation), or a microcrystalline wax (for example, Hi-Mic-2095, Hi-Mic-3090, Hi-Mic-1080, Hi-Mic-1070, Hi-Mic-2065, Hi-Mic-1045, Hi-Mic-2045, EMUSTAR-0001 and EMUSTAR-042X from Nippon Oils and Fats Co., Ltd; Cellosol 967, M, from Chukyo Oils and Fats Co., Ltd.; 55 Microwax and 180 Microwax from Nippon Oil Corporation), and petrolatum (for example, OX-1749, OX-0450, OX-0650B, OX-0153, OX-261BN, OX-0851, OX-0550, OX-0750B, JP-1500, JP-056R and JP-011P from Nippon Oils and Fats Co., Ltd.), and the like.

A content of the natural wax in the toner image-receiving layer (a surface) is preferably 0.1 $g/m^2$ to 4 $g/m^2$, and more preferably 0.2 $g/m^2$ to 2 $g/m^2$. If the content is less than 0.1 $g/m^2$, the anti-offset properties and the adhesive resistance deteriorate. If the content is more than 4 $g/m^2$, the quality of an image may deteriorate because of the excessive amount of wax.

The melting point of the natural wax is preferably 70° C. to 95° C., and more preferably 75° C. to 90° C., from a viewpoint of anti-offset properties and paper transporting properties.

Releasing Agent

The releasing agent of the present invention is blended with the toner image-receiving layer in order to prevent offset of the toner image-receiving layer. There is no particular limitation on the type of releasing agent as long as it dissolves, deposits on a surface of the toner image-receiving layer and is non-uniformly distributed in the surface of the toner image-receiving layer, when heated to the fixing temperature, and forms a layer of material for the releasing agent in the surface of the toner image-receiving layer when cooled and solidified.

The releasing agent of the present invention is at least one releasing agent selected from silicone compounds, fluorine compounds, wax (excluding natural wax) and matting agents. Preferably, it is at least one releasing agent selected from silicone oil, polyethylene wax, silicone particles and polyethylene wax particles.

The releasing agent may for example be a compound mentioned in "*Properties and Applications of Wax* (Revised)" by Saiwai Publishing, or in the *Silicone Handbook* published by THE NIKKAN KOGYO SHIMBUN. Also, the silicone compounds, fluorine compounds and wax (excluding natural wax) in the toners mentioned in Japanese Patent Application Publication (JP-B) No. 59-38581, Japanese Patent Application Publication (JP-B) No. 04-32380, Japanese Patent (JP-B) No. 2838498, Japanese Patent (JP-B) No. 2949558, Japanese Patent Application Laid-Open (JP-A) No. 50-117433, No. 52-52640, No. 57-148755, No. 61-62056, No. 61-62057, No. 61-118760, and Japanese Patent Application Laid-Open (JP-A) No. 02-42451, No. 03-41465, No. 04-212175, No. 04-214570, No. 04-263267, No. 05-34966, No. 05-119514, No. 06-59502, No. 06-161150, No. 06-175396, No. 06-219040, No. 06-230600, No. 06-295093, No. 07-36210, No. 07-43940, No. 07-56387, No. 07-56390, No. 07-64335, No. 07-199681, No. 07-223362, No. 07-287413, No. 08-184992, No. 08-227180, No. 08-248671, No. 08-248799, No. 08-248801, No. 08-278663, No. 09-152739, No. 09-160278, No. 09-185181, No. 09-319139, No. 09-319143, No. 10-20549, No. 10-48889, No. 10-198069, No. 10-207116, No. 11-2917, No. 11-44969, No. 11-65156, No. 11-73049 and No. 11-194542 may be used. Plural sets of these compounds can also be used.

Examples of the silicone compounds include non-modified silicone oils (specifically, dimethyl siloxane oil, methyl hydrogen silicone oil, phenyl methyl-silicone oil, or commercial products such as KF-96, KF-96L, KF-96H, KF-99, KF-50, KF-54, KF-56, KF-965, KF-968, KF-994, KF-995 and HIVAC F-4, F-5 from Shin-Etsu Chemical Co., Ltd.; SH200, SH203, SH490, SH510, SH550, SH710, SH704, SH705, SH7028A, SH7036, SM7060, SM7001, SM7706, SH7036, SH8710, SH1107 and SH8627 from Dow Corning Toray Silicone Co., Ltd.; and TSF400, TSF401, TSF404, TSF405, TSF431, TSF433, TSF434, TSF437, TSF450 series, TSF451 series, TSF456, TSF458 series, TSF483, TSF484, TSF4045, TSF4300, TSF4600, YF33 series, YF-3057, YF-3800, YF-3802, YF-3804, YF-3807, YF-3897, XF-3905, XS69-A1753, TEX100, TEX101, TEX102, TEX103, TEX104, TSW831, and the like from GE Toshiba Silicones), amino-modified silicone oils (for example, KF-857, KF-858, KF-859, KF-861, KF-864 and KF-880 from Shin-Etsu Chemical Co., Ltd., SF8417 and SM8709 from Dow Corning Toray Silicone Co., Ltd., and TSF4700, TSF4701, TSF4702, TSF4703, TSF4704, TSF4705, TSF4706, TEX150, TEX151 and TEX154 from GE Toshiba Silicones), carboxy-modified silicone oils (for example, BY16-880 from Dow Corning Toray Silicone Co., Ltd., TSF4770 and XF42-A9248 from GE Toshiba Silicones), carbinol-modified silicone oils (for example, XF42-B0970 from GE Toshiba Silicones), vinyl-modified silicone oils (for example, XF40-A1987 from GE Toshiba Silicones), epoxy-modified silicone oils (for example, SF8411 and SF8413 from Dow Corning Toray Silicone Co., Ltd.; TSF3965, TSF4730, TSF4732, XF42-A4439, XF42-A4438, XF42-A5041, XC96-A4462, XC96-A4463, XC96-A4464 and TEX170 from GE Toshiba Silicones), polyether-modified silicone oils (for example, KF-351 (A), KF-352 (A), KF-353 (A), KF-354 (A), KF-355 (A), KF-615(A), KF-618 and KF-945 (A) from Shin-Etsu Chemical Co., Ltd.; SH3746, SH3771, SF8421, SF8419, SH8400 and SF8410 from Dow Corning Toray Silicone Co., Ltd.; TSF4440, TSF4441, TSF4445, TSF4446, TSF4450, TSF4452, TSF4453 and TSF4460 from GE Toshiba Silicones), silanol-modified silicone oils, methacryl-modified silicone oils, mercapto-modified silicone oils, alcohol-modified silicone oils (for example, SF8427 and SF8428 from Dow Corning Toray Silicone Co., Ltd., TSF4750, TSF4751 and XF42-B0970 from GE Toshiba Silicones), alkyl-modified silicone oils (for example, SF8416 from Dow Corning Toray Silicone Co., Ltd., TSF410, TSF411, TSF4420, TSF4421, TSF4422, TSF4450, XF42-334, XF42-A3160 and XF42-A3161 from GE Toshiba Silicones), fluorine-modified silicone oils (for example, FS1265 from Dow Corning Toray Silicone Co., Ltd., and FQF501 from GE Toshiba Silicones), silicone rubbers and silicone fine particles (for example, SH851, SH745U, SH55UA, SE4705U, SH502 UA&B, SRX539U, SE6770 U-P, DY38-038, DY38-047, Trefil F-201, F-202, F-250, R-900, R-902A, E-500, E-600, E-601, E-506, BY29-119 from Dow Corning Toray Silicone Co., Ltd.; Tospal 105, Tospal 120, Tospal 130, Tospal 145, Tospal 240 and Tospal 3120 from GE Toshiba Silicones), silicone-modified resins (specifically, olefin resins or polyester resins, vinyl resins, polyamide resins, cellulosic resins, phenoxy resins, vinyl chloride-vinyl acetate resins, urethane resins, acrylic resins, styrene-acrylic resins, compounds in which copolymerization resins thereof are modified by silicone, and the like. Examples of the commercial products include Diaroma SP203V, SP712, SP2105 and SP3023 from Dainichiseika Color & Chemicals Mfg. Co., Ltd.; Modepa FS700, FS710, FS720, FS730 and FS770 from NOF CORPORATION; Simac US-270, US-350, US-352, US-380, US-413, US-450, Reseda GP-705, GS-30, GF-150 and GF-300 from TOAGOSEI CO., LTD.; SH997, SR2114, SH2104, SR2115, SR2202, DCI-2577, SR2317, SE4001U, SRX625B, SRX643, SRX439U, SRX488U, SH804, SH840, SR2107 and SR2115 from Dow Corning Toray Silicone Co., Ltd., YR3370, TSR1122, TSR102, TSR108, TSR116, TSR117, TSR125A, TSR127B, TSR144, TSR180, TSR187, YR47, YR3187, YR3224, YR3232, YR3270, YR3286, YR3340, YR3365, TEX152, TEX153, TEX171 and TEX172 from GE Toshiba Silicones), and reactive silicone compounds (specifically, addition reaction type, peroxide-curing type and ultraviolet radiation curing type, examples include: TSR1500, TSR1510, TSR1511, TSR1515, TSR1520, YR3286, YR3340, PSA6574, TPR6500, TPR6501, TPR6600, TPR6702, TPR6604, TPR6700, TPR6701, TPR6705, TPR6707, TPR6708, TPR6710, TPR6712, TPR6721, TPR6722, UV9300, UV9315, UV9425, UV9430, XS56-A2775, XS56-A2982, XS56-A3075, XS56-A3969, XS56-A5730, XS56-A8012, XS56-B1794, SL6100, SM3000, SM3030, SM3200 and YSR3022 from GE Toshiba Silicones), and the like.

Examples of the fluorine compounds include fluorine oils (for example, Daifluoryl #1, Daifluoryl #3, Daifluoryl #10, Daifluoryl #20, Daifluoryl #50, Daifluoryl #100, Unidyne TG-440, TG-452, TG-490, TG-560, TG-561, TG-590, TG-652, TG-670U, TG-991, TG-999, TG-3010, TG-3020 and TG-3510 from Daikin Industries, Ltd.; MF-100, MF-110, MF-120, MF-130, MF-160 and MF-160E from Tohkem Products; S-111, S-112, S-113, S-121, S-131, S-132, S-141 and S-145 from Asahi Glass Co., Ltd.; and, FC-430 and FC-431 from DU PONT-MITSUI FLUOROCHEMICALS COMPANY, LTD.), fluoro rubbers (for example, LS63U from Dow Corning Toray Silicone Co., Ltd.), fluorine-modified resins (for example, Modepa F200, F220, F600, F2020, F600, F2020, F3035 from Nippon Oils and Fats; Diaroma FF203 and FF204 from Dai Nichi Pure Chemicals; Saflon S-381, S-383, S-393, SC-101, SC-105, KH-40 and SA-100 from Asahi Glass Co., Ltd.; EF-351, EF-352, EF-801, EF-802, EF-601, TFE, TFEA, TFEMA and PDFOH from Tohkem Products; and THV-200P from Sumitomo 3M), fluorine sulfonic acid compound (for example, EF-101, EF-102, EF-103, EF-104, EF-105, EF-112, EF-121, EF-122A, EF-122B, EF-122C, EF-123A, EF-123B, EF-125M, EF-132, EF-135M, EF-305, FBSA, KFBS and LFBS from Tohkem Products), fluorosulfonic acid, and fluorine acid compounds or salts (specifically, anhydrous fluoric acid, dilute fluoric acid, fluoroboric acid, zinc fluoroborate, nickel fluoroborate, tin fluoroborate, lead fluoroborate, copper fluoroborate, fluorosilicic acid, fluorinated potassium titanate, perfluorocaprylic acid, ammonium perfluorooctanoate, and the like), inorganic fluorides (specifically, aluminum fluoride, potassium fluoride, fluorinated potassium zirconate, fluorinated zinc tetrahydrate, calcium fluoride, lithium fluoride, barium fluoride, tin fluoride, potassium fluoride, acid potassium fluoride, magnesium fluoride, fluorinated titanic acid, fluorinated zirconic acid, ammonium hexafluorinated phosphoric acid, potassium hexafluorinated phosphoric acid, and the like).

Examples of the wax (excluding natural wax) include synthetic hydrocarbon, modified wax, hydrogenated wax, and the like.

Examples of the synthetic hydrocarbon include polyethylene wax (for example, polyron A, 393, and H-481 from Chukyo Yushi Co., Ltd.; Sunwax E-310, E-330, E-250P, LEL-250, LEL-800, LEL-400P, from SANYO KASEI Co., Ltd.), polypropyrene wax (for example, biscoal 330-P, 550-P, 660-P from SANYO KASEI Co., Ltd.), Fischer toropush wax (for example, FT100, and FT-0070, from Nippon Seiro Co., Ltd.), an acid amide compound or an acid imide compound (specifically, stearic acid amide, anhydrous phthalic acid imide, or the like; for example, Cellusol 920, B-495, hymicron G-270, G-110, hydrine D-757 from Chukyo Yushi Co., Ltd.), and the like.

Examples of the modified wax include amine-modified polypropyrene (for example, QN-7700 from SANYO KASEI Co., Ltd.), acryl-modified wax, fluorine-modified wax, olefin-modified wax, urethane wax (for example, NPS-6010, and HAD-5090 from Nippon Seiro Co., Ltd.), alcohol wax (for example, NPS-9210, NPS-9215, OX-1949, XO-020T from Nippon Seiro Co., Ltd.), and the like.

Examples of the modified wax include amine-modified polypropyrene (for example, QN-7700 from SANYO KASEI Co., Ltd.), acryl-modified wax, fluorine-modified wax, olefine-modified wax, urethane wax (for example, NPS-6010, and HAD-5090 from Nippon Seiro Co., Ltd.), alcohol wax (for example, NPS-9210, NPS-9215, OX-1949, XO-020T from Nippon Seiro Co., Ltd.), and the like.

Examples of the hydrogenated wax include cured castor oil (for example, castor wax from Itoh Oil Chemicals Co., Ltd.), castor oil derivatives (for example, dehydrated castor oil DCO, DCO Z-1, DCO Z-3, castor oil aliphatic acid CO-FA, ricinoleic acid, dehydrated castor oil aliphatic acid DCO-FA, dehydrated castor oil aliphatic acid epoxy ester D-4 ester, castor oil urethane acrylate CA-10, CA-20, CA-30, castor oil derivative MINERASOL S-74, S-80, S-203, S-42X, S-321, special castor oil condensation aliphatic acid MINERASOL RC-2, RC-17, RC-55, RC-335, special castor oil condensation aliphatic acid ester MINERASOL LB-601, LB-603, LB-604, LB-702, LB-703, #11 and L-164 from Itoh Oil Chemicals Co., Ltd.), stearic acid (for example, 12-hydroxystearic acid from-Itoh Oil Chemicals Co., Ltd.), lauric acid, myristic acid, palmitic acid, behenic acid, sebacic acid (for example, sebacic acid from Itoh Oil Chemicals Co., Ltd.), undecylenic acid (for example, undecylenic acid from Itoh Oil Chemicals Co., Ltd.), heptyl acids (heptyl acids from Itoh Oil Chemicals Co., Ltd.), maleic acid, high grade maleic oils (for example, HIMALEIN DC-15, LN-10, 00-15, DF-20 and SF-20 from Itoh Oil Chemicals Co., Ltd.), blown oils (for example, selbonol #10, #30, #60, R-40 and S-7 from Itoh Oil Chemicals Co., Ltd.) and synthetic wax such as cyclopentadieneic oil (CP oil and CP oil-S from Itoh Oil Chemicals Co., Ltd., or the like), and the like.

The matting agent can be selected from any known matting agent. Solid particles used as matting agents can be classified into inorganic particles and organic particles. Specifically, the inorganic matting agents may be oxides (for example, silicon dioxide, titanium oxide, magnesium oxide, aluminum oxide), alkaline earth metal salts (for example, barium sulfate, calcium carbonate, and magnesium sulfate), silver halides (for example, silver chloride, and silver bromide), glass, and the like.

Examples of the inorganic matting agents can be found, for example, in West German Patent No. 2529321, UK Patent Nos. 760775, 1260772, and U.S. Pat. Nos. 1,201,905, 2,192,241, 3,053,662, 3,062,649, 3,257,206, 3,322,555,3, 353,958, 3,370,951, 3,411,907, 3,437,484, 3,523,022, 3,615, 554, 3,635,714, 3,769,020, 4,021,245 and 4,029,504.

Materials of the organic matting agent include starch, cellulose ester (for example, cellulose-acetate propionate), cellulose ether (for example, ethyl cellulose) and a synthetic resin. It is preferred that the synthetic resin is insoluble or had to become solved. Examples of insoluble or difficult to become solved in synthetic resins include poly(meth)acrylic acid esters (for example, polyalkyl(meth)acrylate, polyalkoxyalkyl(meth)acrylate, polyglycidyl(meth)acrylate), poly(meth) acrylamide, polyvinyl ester (for example, polyvinyl acetate), polyacrylonitrile, polyolefins (for example, polyethylene), polystyrene, benzoguanamine resin, formaldehyde condensation polymer, epoxy resin, polyamide, polycarbonate, phenolic resin, polyvinyl carbazole and polyvinylidene chloride.

Copolymers which combine the monomers used in the above polymers, may also be used.

In the case of the copolymers, a small amount of hydrophilic repeated units may be included. Examples of monomers which form a hydrophilic repeated unit include acrylic acid, methacrylic acid, α, β-unsaturated dicarboxylic acid, hydroxyalkyl(meth)acrylate, sulfoalkyl (meth)acrylate and styrene sulfonic acid.

Examples of organic matting agents can be found, for example, in UK Patent No. 1055713, U.S. Pat. Nos. 1,939, 213, 2,221,873, 2,268,662, 2,322,037, 2,376,005, 2,391,181, 2,701,245, 2,992,101, 3,079,257, 3,262,782, 3,443,946, 3,516,832, 3,539,344, 3,591,379, 3,754,924 and 3,767,448, and JP-A Nos. 49-106821, and 57-14835.

Also, two or more types of solid particles may be used in combination. The average particle size of the solid particles may suitably be, for example, 1 μm to 100 μm, and is more preferably 4 μm to 30 μm. The usage amount of the solid particles may suitably be 0.01 $g/m^2$ to 0.5 $g/m^2$, and is more preferably 0.02 $g/m^2$ to 0.3 $g/m^2$.

The releasing agent added to the toner image-receiving layer of the present invention may also comprise different derivatives thereof, oxides, refined products and mixtures. These may also have reactive substituents.

The melting point (° C.) of this releasing agent is preferably 70° C. to 95° C., and more preferably 75° C. to 90° C. from the viewpoints of anti-offset properties and paper transport properties.

The releasing agent is also preferably a water-dispersible releasing agent, from the viewpoint of compatibility when a water-dispersible thermoplastic resin is used as the thermoplastic resin of the toner image-receiving layer.

The content of the releasing agent in the toner image-receiving layer is preferably 0.1% by mass to 10% by mass, more preferably 0.3% by mass to 8.0% by mass and still more preferably 0.5% by mass to 5.0% by mass.

The content of the releasing agent refers to the entire content of the releasing agent includes the amount of the natural wax.

Colorant

Examples of colorants include fluorescent whitening agent s, white pigments, colored pigments, dyes, and the like.

The fluorescent whitening agent has absorption in the near-ultraviolet region, and is a compound which emits fluorescence at 400 nm to 500 nm. The various fluorescent whitening agent known in the art may be used without any particular limitation. Examples of the fluorescent whitening agent include the compounds described in "*The Chemistry of Synthetic Dyes*" Volume V, Chapter 8 edited by KVeenRataraman. Specific examples include stilbene compounds, coumarin compounds, biphenyl compounds, benzo-oxazoline compounds, naphthalimide compounds, pyrazoline compounds, carbostyryl compounds, and the like. Examples of these include white furfar-PSN, PHR, HCS, PCS, and B from Sumitomo Chemicals, UVITEX-OB from Ciba-Geigy, and the like.

Examples of white pigments are the inorganic pigments described in the "fillers," (for example, titanium oxide, calcium carbonate, and the like). Examples of colored pigments include various pigments and azo pigments described in JP-A No. 63-44653, (for example, azo lakes such as carmine 6B and red 2B, insoluble azo compounds such as monoazo yellow, disazo yellow, pyrazolo orange, Balkan orange, and condensed azo compounds such as chromophthal yellow and chromophthal red), polycyclic pigments (for example, phthalocyanines such as copper phthalocyanine blue and copper phthalocyanine green), thioxadines such as thioxadine violet, isoindolinones such as isoindolinone yellow, surenes such as perylene, perinon, hulavanthoron and thioindigo, lake pigments (for example, malachite green, rhodamine B, rhodamine G and Victoria blue B), and inorganic pigment (for example, oxide, titanium dioxide, iron oxide red, sulfate; settling barium sulfate, carbonate; settling calcium carbonate, silicate; hydrous silicate, silicic anhydride, metal powder; alminium powder, bronze powder, zinc powder, carbon black, chrome yellow, iron blue, or the like) and the like.

These may be used either alone, or in combination of two or more. Of these, titanium oxide is particularly preferred as the pigment.

There is no particular limitation on the form of the pigment. However, hollow particles are preferred from the viewpoint that they have excellent heat conductivity (low heat conductivity) during image fixing.

The various dyes known in the art may be used as the dye.

Examples of oil-soluble dyes include anthraquinone compounds, azo compounds, and the like.

Examples of water-insoluble dyes include vat dyes such as C.I. Vat violet 1, C.I. Vat violet 2, C.I. Vat violet 9, C.I. Vat violet 13, C.I. Vat violet 21, C.I. Vat blue 1, C.I. Vat blue 3, C.I. Vat blue 4, C.I. Vat blue 6, C.I. Vat blue 14, C.I. Vat blue 20 and C.I. Vat blue 35, or the like; disperse dyes such as C.I. disperse violet 1, C.I. disperse violet 4, C.I. disperse violet 10, C.I. disperse blue 3, C.I. disperse blue 7, C.I. disperse blue 58, or the like; and oil-soluble dyes such as C.I. solvent violet 13, C.I. solvent violet 14, C.I. solvent violet 21, C.I. solvent violet 27, C.I. solvent blue 11, C.I. solvent blue 12, C.I. solvent blue 25, C.I. solvent blue 55, or the like.

Colored couplers used in silver halide photography may also be preferably used.

A content ($g/m^2$) of the colorant in the toner image-receiving layer (surface) is preferably 0.1 $g/m^2$ to 8 $g/m^2$, and more preferably 0.5 $g/m^2$ to 5 $g/m^2$.

If the content of colorant is less than 0.1 $g/m^2$, the light transmittance in the toner image-receiving layer becomes high. If the content of the colorant is more than 8 $g/m^2$, handling becomes more difficult due to crack, and adhesive resistance.

A content ratio of the colorant to the natural wax (colorant/natural wax) is preferably 0.1/2 to 8/0.1, and more preferably 0.5/1.5 to 5/0.2.

If the content ratio is less than the above range, the electrophotographic image-receiving sheet has insufficient transparency. If the content ratio is more than the above range, the electrophotographic image-receiving sheet shows the insufficient anti-offset properties.

Other Components

Examples of other components are various additives which may be added to improve the thermodynamic properties of the toner image-receiving layer. Examples of the other components include plasticizers, fillers, crosslinking agents, charge control agents, emulsifiers, dispersants, and the like. It is preferred that the other components contained in the toner image-receiving layer have hollow particles, and particularly preferred that the pigment has hollow particles, as the toner image-receiving layer then has excellent heat conductivity (low heat conductivity) during image fixing.

Plasticizers

The plasticizers known in the art may be used without any particular limitation. These plasticizers have the effect of adjusting the fluidity or softening of the toner image-receiving layer due to heat and/or pressure.

The plasticizer may be selected by referring to "Chemical Handbook," (Chemical Institute of Japan, Maruzen), "Plasticizers—their Theory and Application," (ed. Koichi Murai, Saiwai Shobo), "The Study of Plasticizers, Part 1" and "The Study of Plasticizers, Part 2" (Polymer Chemistry Association), or "Handbook of Rubber and Plastics Blending Agents" (ed. Rubber Digest Co.), or the like.

Some of the plasticizers are listed as high boiling point organic solvents, heat solvents, or the like. Examples of the plasticizers include esters (for example, phthalic esters, phosphate esters, aliphatic acid esters, abiethyne acid ester, abietic acid ester, sebacic acid esters, azelinic ester, benzoates, butylates, epoxy aliphatic acid esters, glycolic acid esters, propionic acid esters, trimellitic acid esters, citrates, sulfonates, carboxylates, succinic acid esters, maleates, fumaric acid esters, phthalic acid esters, stearic acid esters, and the like), amides (for example, aliphatic acid amides and sulfoamides), ethers, alcohols, lactones, polyethyleneoxy compounds, disclosed in JP-A Nos. 59-83154, 59-178451, 59-178453, 59-178454, 59-178455, 59-178457, 62-174754, 62-245253, 61-209444, 61-200538, 62-8145, 62-9348, 62-30247, 62-136646, 62-174754, 62-245253, 61-209444, 61-200538, 62-8145, 62-9348, 62-30247, 62-136646 and 02-235694, or the like.

The plasticizers can be mixed into resin.

The plasticizers may be polymers having relatively low molecular weight. In this case, it is preferred that the molecular weight of the plasticizer is lower than the molecular weight of the binder resin to be plasticized. Preferably plasticizers have a molecular weight of 15000 or less, or more preferably 5000 or less. Further, oligomers may also be used as plasticizers. Apart from the compounds mentioned above, there are products such as, for example, Adecasizer PN-170 and PN-1430 from Asahi Denka Co., Ltd.; PARAPLEX-G-25, G-30 and G-40 from C. P. Hall; and, rosin ester 8 L-JA, ester R-95, pentalin 4851, FK 115, 4820, 830, Ruizol 28-JA, Picolastic A75, Picotex LC and Cristalex 3085 from Rika Hercules, Inc, and the like.

The plasticizer can be used as desired to relax stress and distortion (physical distortions of elasticity and viscosity, and distortions of mass balance in molecules, binder main chains or pendant portions) which are produced when toners are embedded in the toner image-receiving layer.

The plasticizer may be dispersed as microparticles in the toner image-receiving layer, may be phase-separated on the micro level as islands, or may be completely mixed and dissolved in other components such as the binder.

The content of plasticizer in the toner image-receiving layer is preferably 0.001% by mass to 90% by mass, more preferably 0.1% by mass to 60% by mass, and still more preferably 1% by mass to 40% by mass.

The plasticizer may be used for the purposes of adjusting slip properties (improved transportability due to decrease in friction), improving offset at a fixing part (separation of toner or layers onto the fixing part), adjusting curl balance or adjusting charge (forming a toner electrostatic image).

Filler

The filler may be an organic or inorganic filler. Reinforcers for binder resins, bulking agents and reinforcements known in the art may be used. This filler may be selected by referring to "Handbook of Rubber and Plastics Additives" (ed. Rubber Digest Co.), "Plastics Blending Agents—Basics and Applications" (New Edition) (Taisei Co.), "The Filler Handbook" (Taisei Co.), or the like.

As the filler, various inorganic fillers (or pigments) can be used. Examples of inorganic pigments include silica, alumina, titanium dioxide, zinc oxide, zirconium oxide, micaceous iron oxide, white lead, lead oxide, cobalt oxide, strontium chromate, molybdenum pigments, smectite, magnesium oxide, calcium oxide, calcium carbonate, mullite, and the like. Silica and alumina are particularly preferred. These fillers may be used either alone or in combination of two or more. It is preferred that the filler has a small particle diameter. If the particle diameter is large, the surface of the toner image-receiving layer tends to become rough.

Silica includes spherical silica and amorphous silica. The silica may be synthesized by the dry method, wet method or aerogel method. The surface of the hydrophobic silica particles may also be treated by trimethylsilyl groups or silicone. Colloidal silica is preferred. The average particle diameter of the silica is preferably 200 nm to 5000 nm.

The silica is preferably porous. The average particle diameter of the porous silica is preferably 4 nm to 120 nm, and more preferably 4 nm to 90 nm. The average pore volume per mass of porous silica is preferably 0.5 ml/g to 3 ml/g, for example.

The alumina includes anhydrous alumina and hydrated alumina. Examples of crystallized anhydrous aluminas which may be used are $\alpha$, $\beta$, $\gamma$, $\delta$, $\xi$, $\eta$, $\theta$, $\kappa$, $\rho$ or $\chi$. Hydrated alumina is preferred to anhydrous alumina. The hydrated alumina may be a monohydrate or trihydrate. Monohydrates include pseudo-boehmite, boehmite and diaspore. Trihydrates include gibbsite and bayerite. The average particle diameter of alumina is preferably 4 nm to 300 nm, and more preferably 4 nm to 200 nm. Porous alumina is preferred. The average pore size of porous alumina is preferably 50 nm to 500 nm. The average pore volume per mass of porous alumina is around 0.3 ml/g to 3 ml/g.

The alumina hydrate can be synthesized by the sol-gel method, in which ammonia is added to an aluminum salt solution to precipitate alumina, or by hydrolysis of an alkali aluminate. Anhydrous alumina can be obtained by dehydrating alumina hydrate by the action of heat.

It is preferred that the filler is 5 parts by mass to 2000 parts by mass, relative to the dry mass of the binder in the layer where the filler is to be added.

Crosslinking Agent

A crosslinking agent can be added in order to adjust the storage stability or thermoplastic properties of the toner image-receiving layer. Examples of the crosslinking agent include compounds containing two or more reactive groups in the molecule, such as an epoxy group, an isocyanate group, an aldehyde group, an active halogen group, an active methylene group, an acetylene group and other reactive groups known in the art.

The crosslinking agent may also be a compound having two or more groups capable of forming bonds such as hydrogen bonds, ionic bonds, stereochemical bonds, or the like.

The crosslinking agent may be a compound known in the art such as a coupling agent for resin, curing agent, polymerizing agent, polymerization promoter, coagulant, film-forming agent, film-forming assistant, or the like. Examples of the coupling agents include chlorosilanes, vinylsilanes, epoxisilanes, aminosilanes, alkoxyaluminum chelates, titanate coupling agents, and the like. The examples further include other agents known in the art such as those mentioned in Handbook of *Rubber and Plastics Additives* (ed. Rubber Digest Co.).

Charge Control Agent

It is preferred that the toner image-receiving layer contains a charge control agent to adjust toner transfer and adhesion, and to prevent charge adhesion. The charge control agent may be any charge control agent known in the art. Examples of the charge control agent include surfactants such as a cationic surfactant, an anionic surfactant, an amphoteric surfactant, a nonionic surfactant, or the like; polymer electrolytes, electroconducting metal oxides, and the like. Examples include cationic charge inhibitors such as quaternary ammonium salts, polyamine derivatives, cation-modified polymethylmethacrylate, cation-modified polystyrene, or the like; anionic charge inhibitors such as alkyl phosphates, anionic polymers, or the like; and nonionic charge inhibitors such as aliphatic ester, polyethylene oxide, or the like. The examples are not limited thereto, however.

When the toner has a negative charge, it is preferred that the charge control agent blended with the toner image-receiving layer is, for example, cationic or nonionic.

Examples of the electroconducting metal oxides include $ZnO$, $TiO_2$, $SnO_2$, $Al_2O_3$, $In_2O_3$, $SiO_2$, $MgO$, $BaO$, $MoO_3$, and the like. These electroconducting metal oxides may be used alone, or may be used in the form of a complex oxide. Moreover, the metal oxide may contain other elements. For example, $ZnO$ may contain Al, In, or the like, $TiO_2$ may contain Nb, Ta, or the like, and $SnO_2$ may contain (or, dope) Sb, Nb, halogen elements, or the like.

Other Additives

The materials used to obtain the toner image-receiving layer may also contain various additives to improve image stability when output, or to improve stability of the toner image-receiving layer itself. Examples of the additives used for these purposes include antioxidants, age resistors, degradation inhibitors, anti-ozone degradation inhibitors, ultraviolet ray absorbers, metal complexes, light stabilizers, preservatives, fungicide, and the like.

Examples of the antioxidants include chroman compounds, coumarane compounds, phenol compounds (for example, hindered phenols), hydroquinone derivatives, hindered amine derivatives, spiroindan compounds, and the like. The antioxidants can be found, for example, in JP-A No. 61-159644.

Examples of the age resistors can be found in "Handbook of Rubber and Plastics Additives," Second Edition (1993, Rubber Digest Co.), pp. 76–121;

Examples of the ultraviolet ray absorbers include benzotriazo compounds (described in U.S. Pat. No. 3,533,794), 4-thiazolidone compounds (described in U.S. Pat. No. 3,352,681), benzophenone compounds (described in JP-A No. 46-2784), ultraviolet ray absorbing polymers (described in JP-A No. 62-260152).

Examples of the metal complexes can be found in U.S. Pat. Nos. 4,241,155, 4,245,018, 4,254,195, and JP-A Nos. 61-88256, 62-174741, 63-199248, 01-75568, 01-74272.

The ultraviolet ray absorbers and the light stabilizers can be found in *Handbook of Rubber and Plastics Additives*, Second Edition (1993, Rubber Digest Co.), pp 122–137 may also be used.

Photographic additives known in the art may also be added to the material used to obtain the toner image-receiving layer as described above. Examples of the photographic additives can be found in the Journal of Research Disclosure (hereafter referred to as RD) No. 17643 (December 1978), No. 18716 (November 1979) and No. 307105 (November 1989). The relevant sections are shown.

| Type of additive | RD17643 | RD18716 | RD307105 |
|---|---|---|---|
| 1. Whitener | p 24 | p 648, right-hand column | p 868 |
| 2. Stabilizer | pp. 24–25 | p 649, right-hand column | pp. 868–870 |
| 3. Light absorbers (ultraviolet ray absorbers) | p 25–26 | p 649, right-hand column | p 873 |
| 4. Pigment image stabilizers | p 25 | p 650, right-hand column | p 872 |
| 5. Filmhardening agents | p 26 | p 651, right-hand column | pp. 874–875 |
| 6. Binders | p 26 | p 651, left-hand column | pp. 873–874 |
| 7. Plasticizers, lubricants | p 27 | p 650, right-hand column | p 876 |
| 8. Coating assistants (surfactants) | pp. 26–27 | p 650, right-hand column | pp. 875–876 |
| 9. Antistatic agents | p 27 | p650, right-hand column | pp. 867–877 |
| 10. Matting agents | | | pp. 878–879 |

The toner image-receiving layer is formed by applying a coating solution which contains the polymer used for the toner image-receiving layer with a wire coater or the like to the support, and drying the coating solution. The coating solution is prepared by dissolving or uniformly dispersing an additive such as a thermoplastic polymer, a plasticizer, or the like, into an organic solvent such as alcohol, ketone, or the like. The organic solvent used here may for example be methanol, isopropyl alcohol, methyl ethyl ketone, or the like. If the polymer used for the toner image-receiving layer is water-soluble, the toner image-receiving layer can be prepared by applying an aqueous solution of the polymer to the support. Polymers which are not water-soluble may be applied to the support in an aqueous dispersion.

The film-forming temperature of the polymer is preferably room temperature or higher, from the viewpoint of pre-print storage, and preferably 100° C. or lower, from the viewpoint of fixing toner particles.

The toner image-receiving layer is coated so that the amount of coating in mass after drying is preferably 1 $g/m^2$ to 20 $g/m^2$, and more preferably 4 $g/m^2$ to 15 $g/m^2$.

There is no particular limitation on the thickness of the toner image-receiving layer. However, it is preferably 1 μm to 30 μm, and more preferably 2 μm to 20 μm.

Physical Properties of Toner Image-receiving Layer

It is preferred that the toner image-receiving layer has a high degree of whiteness. This whiteness is measured by the method specified in JIS P 8123, and is preferably 85% or more. It is preferred that the spectral reflectance is 85% or more in the wavelength of 440 nm to 640 nm, and that the difference between the maximum spectral reflectance and minimum spectral reflectance in this wavelength is within 5%. Further, it is preferred that the spectral reflectance is 85% or more in the wavelength of 400 nm to 700 nm, and that the difference between the maximum spectral reflectance and the minimum spectral reflectance in the wavelength is within 5%.

Specifically, for the whiteness, the value of L* is preferably 80 or higher, more preferably 85 or higher, and still more preferably 90 or higher in a CIE 1976 (L*a*b*) color space. The color tint of the white color is preferably as neutral as possible. Regarding the color tint of the whiteness, the value of $(a^*)^2+(b^*)^2$ is preferably 50 or less, more preferably 18 or less and still more preferably 5 or less in a (L*a*b*) space.

It is preferred that the toner image-receiving layer has a high surface gloss. The 45° gloss luster is preferably 60 or higher, more preferably 75 or higher, and still more preferably 90 or higher, over the whole range from white where there is no toner, to black where toner is densed at maximum.

However, the gloss luster is preferably 110 or less. If it is more than 110, the image has a metallic appearance which is undesirable.

Gloss luster may be measured by JIS Z 8741.

It is preferred that the toner image-receiving layer has a high smoothness. The arithmetic average roughness (Ra) is preferably 3 μm or less, more preferably 1 μm or less, and still more preferably 0.5 μm or less, over the whole range from white where there is no toner, to black where toner is densed at maximum.

Arithmetic average roughness may be measured by JIS B 0601, B 0651, and B 0652.

It is preferred that the toner image-receiving layer has one of the following physical properties, more preferred that it has several of the following physical properties, and most preferred that it has all of the following physical properties.

(1) Tg (glass transition temperature) of the toner image-receiving layer is 30° C. or higher, and Tg of the toner plus 20° C., or less.

(2) T½ (a softening point measured by ½ method) of the toner image-receiving layer is 60° C. to 200° C., and preferably 80° C. to 170° C. Herein, the softening point measured by the ½ method is measured using a special apparatus. The softening point is taken to be the temperature which is ½ of the difference in piston strokes when flow starts and flow ends at various temperatures, when the temperature is increased at a predetermined uniform rate after a residual heat time of, for example, 300 seconds, at the initial set temperature (for example, 50° C.), while applying a predetermined extrusion load under specific conditions.

(3) Tfb (flow initiating temperature) of the toner image-receiving layer is 40° C. to 200° C., and Tfb of the toner image-receiving layer is preferably Tfb of the toner plus 50° C., or less.

(4) The temperature at which the viscosity of the toner image-receiving layer is $1\times10^5$ cp is 40° C. or higher, and lower than the corresponding temperature for the toner.

(5) At a fixing temperature of the toner image-receiving layer, the storage elasticity modulus (G') is $1\times10^2$ Pa to $1\times10^5$ Pa, and the loss elasticity modulus (G") is $1\times10^2$ Pa to $1\times10^5$ Pa.

(6) The loss tangent (G'/G"), which is the ratio of the loss elasticity modulus (G") and the storage elasticity modulus (G') at a fixing temperature of the toner image-receiving layer, is 0.01 to 10.

(7) The storage modulus (G') at a fixing temperature of the toner image-receiving layer is minus 50 to plus 2500, relative to the storage elasticity modulus (G") at a fixing temperature of the toner.

(8) The inclination angle on the toner image-receiving layer of the molten toner is 50° or less, and particularly preferably 40° or less. The toner image-receiving layer preferably satisfies the physical properties described in Japanese Patent No. 2788358, and JP-A Nos. 07-248637, 08-305067 and 10-239889.

Physical property (1) may be measured by a differential scanning calorimeter (DSC). Physical properties (2) and (3) may be measured, for example, by Flow Tester CFT-500 or 500D produced by Shimadzu Corporation. Physical properties (5) to (7) may be measured using a rotating rheometer (for example, Dynamic Analyser RADII produced by Rheometric Scientific F. E. Ltd.). Physical property (8) may be measured by the process disclosed in JP-A No. 08-334916 using a Contact Angle Measurement Apparatus, Kyowa Interface Science Co., LTD.

It is preferred that the surface electrical resistance of the toner image-receiving layer is $1\times10^6$ Ω/cm$^2$ to $1\times10^{15}$ Ω/cm$^2$ (under conditions of 25° C., 65% RH).

If the surface electrical resistance is less than $1\times10^6$ Ω/cm$^2$, the toner amount transferred to the toner image-receiving layer is insufficient, and the density of the toner image obtained may be too low. On the other hand, if the surface electrical resistance is more than $1\times10^{15}$ Ω/cm$^2$, more charge than necessary is produced during transfer. Therefore, toner is transferred insufficiently, image density is low and static electricity develops causing dust to adhere during handling of the electrophotographic image-receiving sheet, or misfeed, overfeed, discharge marks or toner transfer dropout may occur.

The surface electrical resistance of the surface on the opposite side of the support to the toner image-receiving layer is preferably $5\times10^8$ Ω/cm$^2$ to $3.2\times10^{10}$ Ω/cm$^2$, and more preferably $1\times10^9$ Ω/cm$^2$ to $1\times10^{10}$ Ω/cm$^2$.

The surface electrical resistances were measured based on JIS K 6911. The sample was left with air-conditioning for 8 hours or more at a temperature of 20° C. and the humidity of 65%. Measurements were made using an R8340 produced by Advantest Ltd., under the same environmental conditions after giving an electric current for 1 minute at an applied voltage of 100V.

[Other Layers]

Other layers may include, for example, a surface protective layer, backing layer, contact improving layer, intermediate layer, undercoat, cushion layer, charge control (inhibiting) layer, reflecting layer, tint adjusting layer, storage ability improving layer, anti-adhering layer, anti-curl layer, smoothing layer, and the like. These layers may have a single-layer structure or two or more.

Surface Protective Layer

A surface protective layer is disposed on the surface of the toner image-receiving layer to protect the surface of the electrophotographic image-receiving sheet, to improve storage properties, to improve ease of handling, to facilitate writing, to improve paper transporting properties within an equipment, to confer anti-offset properties, or the like. The surface protective layer may comprise one layer, or two or more layers. In the surface protective layer, various thermoplastic resins or thermocuring resins may be used as binders, and are preferably the same types of resins as those of the toner image-receiving layer. However, the thermodynamic properties and electrostatic properties are not necessarily identical to those of the toner image-receiving layer, and may be individually optimized.

The surface protective layer may comprise the various additives described above which can be used for the toner image-receiving layer. In particular, in addition to the releasing agents, the surface protective layer may include other additives, for example matting agents or the like. The matting agents may be any of these used in the related art.

From the viewpoint of fixing properties, it is preferred that the outermost surface layer of the electrophotographic image-receiving sheet (which refers to, for example, the surface protective layer, if disposed) has good compatibility with the toner. Specifically, it is preferred that the contact angle with molten toner is for 0° to 40°.

Backing Layer

It is preferred that, in the electrophotographic image-receiving sheet, a backing layer is disposed on the opposite side of the support to the toner image-receiving layer in order to confer back surface output compatibility, and to improve back surface output image quality, curl balance and paper transporting properties within equipment.

There is no particular limitation on the color of the backing layer. However, if the electrophotographic image-receiving sheet of the invention is a double-sided output image-receiving sheet where an image is formed also on the back surface, it is preferred that the backing layer is also white. It is preferred that the whiteness and spectral reflectance are 85% or more, as in the case of the top surface.

To improve double-sided output compatibility, the backing layer may have an identical structure to that of the toner image-receiving layer. The backing layer may comprise the various additives described hereintofore. Of these additives, matting agents and charge control agents are particularly suitable. The backing layer may be a single layer, or may have a laminated structure comprising two or more layers.

Further, if releasing oil is used for the fixing roller, or the like, to prevent offset during fixing, the backing layer may have oil absorbing properties.

Contact Improving Layer

In the electrostatic image-receiving sheet, it is preferred to dispose a contact improving layer in order to improve the contact between the support and the toner image-receiving layer. The contact improving layer may contain the various additives described above. Of these, crosslinking agents are particularly preferred to be blended in the contact improving layer. Furthermore, to improve accepting properties to toner, it is preferred that the electrostatic image-receiving sheet further comprises a cushion layer between the contact improving layer and the toner image-receiving layer.

Intermediate Layer

An intermediate layer may be disposed, for example, between the support and the contact improving layer, the contact improving layer and the cushion layer, the cushion layer and the toner image-receiving layer, or the toner image-receiving layer and the storage improving layer. In an electrostatic image-receiving sheet comprising a support, a toner image-receiving layer and an intermediate layer, the intermediate layer may be disposed, for example, between the support and toner image-receiving layer.

A thickness of the electrophotographic image-receiving sheet is not particularly limited and can be selected according to necessity. The thickness is preferably 50 μm to 350 μm, and more preferably 100 μm to 280 μm.

<Toner>

In the electrostatic image-receiving sheet, the toner image-receiving layer receives toners during printing or copying.

The toner contains at least a binder resin and a colorant, but may contain releasing agents and other components, if necessary.

Binder Resin for Toner

Examples of the binder resin include vinyl monopolyer of: styrenes such as styrene, parachlorostyrene, or the like; vinyl esters such as vinyl naphthalene, vinyl chloride, vinyl bromide, vinyl fluoride, vinyl acetate, vinyl propioniate, vinyl benzoate, vinyl butyrate, or the like; methylene aliphatic carboxylates such as methyl acrylate, ethyl acrylate, n-butyl acrylate, isobutyl acrylate, dodecyl acrylate, n-octyl acrylate, 2-chloroethyl acrylate, phenyl acrylate, α-methyl chloroacrylate, methyl methacrylate, ethyl methacrylate, butyl acrylate, or the like; vinyl nitriles such as acryloniotrile, methacrylonitrile, acrylamide, or the like; vinyl ethers such as vinyl methyl ether, vinyl ethyl ether, vinyl isobutyl ether, or the like; N-vinyl compounds such as N-vinyl pyrrole, N-vinylcarbazole, N-vinyl indole, N-vinyl pyrrolidone, or the like; and vinyl carboxylic acids such as methacrylic acid, acrylic acid, cinnamic acid, or the like. These vinyl monomers may be used either alone, or copolymers thereof may be used. In addition, various polyesters may be used, and various wax may be used in combination.

Of these resins, it is preferable to use a resin of the same type as the resin used for the toner image-receiving layer.

Colorants for the Toner

The colorants generally used in the art can be used without limitation. Examples of the colorants include carbon black, chrome yellow, Hansa yellow, benzidine yellow, thuren yellow, quinoline yellow, permanent orange GTR, pyrazolone orange, Balkan orange, watch young red, permanent red, brilliant carmin 3B, brilliant carmin 6B, dippon oil red, pyrazolone red, lithol red, rhodamine B lake, lake red C, rose bengal, aniline blue, ultramarine blue, chalco oil blue, methylene blue chloride, phthalocyanine blue, phthalocyanine green, malachite green oxalate, or the like. Various dyes may also be added such as acridine, xanthene, azo, benzoquinone, azine, anthraquinone, thioindigo, dioxadine, thiadine, azomethine, indigo, thioindigo, phthalocyanine, aniline black, polymethine, triphenylmethane, diphenylmethane, thiazine, thiazole, xanthene, or the like. These colorants may be used either alone, or in combination of a plurality of colorants.

It is preferred that the content of the colorant is 2% by mass to 8% by mass. If the content of colorant is more than 2% by mass, the coloration does not become weaker. If it is 8% by mass or less, transparency does not deteriorate.

Releasing Agent for the Toner

The releasing agent may be in principle any of the wax known in the art. Polar wax containing nitrogen such as highly crystalline polyethylene wax having relatively low molecular weight, Fischertropsch wax, amide wax, urethane wax, and the like are particularly effective. For polyethylene wax, it is particularly effective if the molecular weight is 1000 or less, and is more preferably if the molecular weight is 300 to 1000.

Compounds containing urethane bonds have a solid state due to the strength of the cohesive force of the polar groups even if the molecular weight is low, and as the melting point can be set high in view of the molecular weight, they are suitable. The preferred molecular weight is 300 to 1000. The initial materials may be selected from various combinations such as a diisocyane acid compound with a mono-alcohol, a monoisocyanic acid with a mono-alcohol, dialcohol with mono-isocyanic acid, tri-alcohol with a monoisocyanic acid, and a triisocyanic acid compound with mono-alcohol. To prevent the increase of molecular weight, it is preferred to use a combination of compounds with polyfunctional groups and monofunctional groups, and it is important to use equivalent amounts of functional groups.

Among the initial materials, examples of the monoisocyanic acid compounds are dodecyl isocyanate, phenyl isocyanate and derivatives thereof, naphthyl isocyanate, hexyl isocyanate, benzyl isocyanate, butyl isocyanate, allyl isocyanate, and the like.

Examples of the diisocyanic acid compounds include tolylene diisocyanate, 4,4'-diphenylmethane diisocyanate, toluene diisocyanate, 1,3-phenylene diisocyanate, hexamethylene diisocyanate, 4-methyl-m-phenylene diisocyanate, isophorone diisocyanate, and the like.

Examples of the mono-alcohol include ordinary alcohols such as methanol, ethanol, propanol, butanol, pentanol, hexanol, heptanol, and the like.

Among the initial materials, examples of the di-alcohols include numerous glycols such as ethylene glycol, diethylene glycol, triethylene glycol, trimethylene glycol, or the like; and examples of the tri-alcohols include trimethylol propane, triethylol propane, trimethanolethane, and the like. The present invention is not necessarily limited these examples, however.

These urethane compounds may be mixed with the resin or the colorant during kneading, as an ordinary releasing agent, and used also as a kneaded-crushed toner. Further, in a case of using an emulsion polymerization cohesion scorification toner, the urethane compounds may be dispersed in water together with an ionic surfactant, polymer acid or polymer electrolyte such as a polymer base, heated above the melting point, and converted to fine particles by applying an intense shear in a homogenizer or pressure discharge dispersion machine to manufacture a releasing agent particle dispersion of 1 μm or less, which can be used together with a resin particle dispersion, colorant dispersion, or the like.

Toner, Other Components

The toner may also contain other components such as internal additives, charge control agents, inorganic particles, or the like. Examples of the internal additives include metals such as ferrite, magnetite, reduced iron, cobalt, nickel, manganese, or the like; alloys or magnetic bodies such as compounds containing these metals.

Examples of the charge control agents include dyes such as quaternary ammonium salt, nigrosine compounds, dyes made from complexes of aluminum, iron and chromium, or triphenylmethane pigments. The charge control agent can be selected from the ordinary charge control agent. Materials which are difficult to become solved in water are preferred from the viewpoint of controlling ionic strength which affects cohesion and stability during melting, and the viewpoint of less waste water pollution.

The inorganic fine particles may be any of the external additives for toner surfaces generally used, such as silica, alumina, titania, calcium carbonate, magnesium carbonate, tricalcium phosphate, or the like. It is preferred to disperse these with an ionic surfactant, polymer acid or polymer base.

Surfactants can also be used for emulsion polymerization, seed polymerization, pigment dispersion, resin particle dispersion, releasing agent dispersion, cohesion or stabilization thereof. Examples of the surfactants include anionic surfactants such as sulfuric acid ester salts, sulfonic acid salts, phosphoric acid esters, soaps, or the like; cationic surfactants such as amine salts, quaternary ammonium salts, or the like. It is also effective to use non-ionic surfactants such as polyethylene glycols, alkylphenol ethylene oxide adducts, polybasic alcohols, or the like. These may generally be dispersed by a rotary shear homogenizer or a ball mill, sand mill, dyno mill, or the like, all of which contain the media.

The toner may also contain an external additive, if necessary. Examples of the external additive include inorganic powder, organic particles, and the like. Examples of the inorganic particles include $SiO_2$, $TiO_2$, $Al_2O_3$, CuO, ZnO, $SnO_2$, $Fe_2O_3$, MgO, BaO, CaO, $K_2O$, $Na_2O$, $ZrO_2$, CaO. $SiO_2$, $K_2O.(TiO_2)_n$, $Al_2O_3.2SiO_2$, $CaCO_3$, $MgCO_3$, $BaSO_4$, $MgSO_4$, and the like. Examples of the organic particles include aliphatic acids, derivatives thereof, and the like, powdered metal salts thereof, and resin powders such as fluorine resin, polyethylene resin, acrylic resin, or the like. The average particle diameter of the powder may be, for example, 0.01 μm to 5 μm, and is more preferably 0.1 μm to 2 μm.

There is no particular limitation on the process of manufacturing the toner, but it is preferably manufactured by a process comprising the steps of (i) forming cohesive particles in a dispersion of resin particles to manufacture a cohesive particle dispersion, (ii) adding a fine particle dispersion to the cohesive particle dispersion so that the fine particles adhere to the cohesive particles, thus forming adhesion particles, and (iii) heating the adhesion particles which melt to form toner particles.

Toner Physical Properties

It is preferred that the volume average particle diameter of the toner is from 0.51 μm to 10 μm.

If the volume average particle diameter of the toner is too small, it may have an adverse effect on handling of the toner (supplementation, cleaning properties, fluidability, or the like), and particle productivity may deteriorate. On the other hand, if the volume average particle damage is too large, it may have an adverse effect on image quality and resolution due to granulariness and transferring properties.

It is preferred that the toner satisfies the toner volume average particle diameter range, and that the volume average particle distribution index (GSDv) is 1.3 or less.

It is preferred that the ratio (GSDv/GSDn) of the volume average polymer distribution index (GSDv) and the number average particle distribution index (GSDn) is 0.95 or more.

It is preferred that the toner satisfies the volume average particle diameter range, and that the average value of the formation coefficient expressed by the following equation is 1.00 to 1.50.

$$\text{Formation coefficient}=(\pi\times L^2)/(4\times S)$$

(where, "L" is the maximum length of the toner particles, and "S" is the projection surface area of a toner particle).

If the toner satisfies the above conditions, it has a desirable effect on image quality, and in particular, granulariness and resolution. Also, there is less risk of dropout and blur accompanying with toner transferring, and less risk of adverse effect on handling properties even if the average particle diameter is not small.

The storage elasticity modulus G' (measured at an angular frequency of 10 rad/sec) of the toner itself at 150° C. is 10 Pa to 200 Pa, which is suitable for improving image quality and preventing offset in a fixing step. <Process for Image Formation>

An process for image formation according to the present invention comprises, in a first aspect, the step of forming a toner image on the electrophotographic image-receiving sheet of the present invention, the step of heating and pressurizing a surface of the electrophotgrahic image-receiving sheet on which the toner image is formed with a fixing bet and a roller, and the step of cooling the surface, so as to separate the surface from the fixing belt.

An process for image formation comprises, in a second aspect, the step of forming a toner image on the electrophotographic image-receiving sheet of the present invention, the step of fixing the toner image with a heat roller; the step of heating and pressurizing a surface of the electrophotgrahic image-receiving sheet on which the toner image is formed with a fixing belt and a roller; and the step of cooling the surface, so as to separate the surface from the fixing belt.

The process for transferring of the present invention utilizes ordinary processes employed in a process for electrophotography. Specifically, one of the ordinary processes may be directly transferring a toner image formed on a development roller onto an electrophotographic image-receiving sheet. The process may be the intermediate transfer belt process, where a toner image is first transferred onto an intermediate transfer belt, and is then transferred onto an electrophotographic image-receiving sheet. From the viewpoints of surrounding stability and higher quality image, the intermediate transfer belt process is more preferable.

Regarding the electrophotographic image-receiving sheet of the present invention, the toner transferred to the image-receiving sheet is fixed on the image-receiving sheet using an apparatus for electrophotography having a fixing belt. The belt fixing method may for example be the oilless apparatus for electrophotography as described in JP-A No. 11-352819, or the method where a secondary transfer and fixing are realized simultaneously as described in JP-A Nos. 11-231671 and 05-341666. An apparatus for electrophotography having a fixing belt according to the present invention may be an apparatus for electrophotography comprising for example at least a heating and pressurizing part which can melt and pressurize the toner, a fixing belt which can transport the electrophotographic image-receiving sheet with toner adhering while in contact with the toner image-receiving layer, and a cooling part which can cool the heated image-receiving sheet while it is still adhering to the fixing belt. By using the electrophotographic image-receiving sheet comprising the toner image-receiving layer in the apparatus for electrophotography comprising the fixing belt, toner adhering to the toner image-receiving layer is fixed in fine detail without spreading into the image-receiving material, and the molten toner is cooled and solidified, while adhering closely to the fixing belt. The toner is received while it is completely embedded in the toner image-receiving layer. Therefore, there are no image discrepancies, and a glossy and smooth toner image is obtained.

The electrophotographic image-receiving sheet is particularly suitable for forming an image by the oilless belt fixing method, and it permits a large improvement of offset. However, other methods for forming an image may also likewise be used.

For example, by using the electrophotographic image-receiving sheet of the present invention, a full-color image can easily be formed while improving image quality and preventing cracks. A full-color image can be formed using an apparatus for electrophotography capable of forming full-color images. An ordinary apparatus for electrophotography comprises an image-receiving paper transporting part, latent image-forming part, and developing part disposed in the vicinity of the latent image-forming part. Depending on the type, it may also comprise a latent image-forming part in the center of the apparatus and a toner image intermediate transfer part in the vicinity of the image-receiving paper transport part.

To improve image quality, adhesive transfer or heat assistance transfer may be used instead of the electrostatic transfer or bias roller transfer, or in combination therewith. Specific details of these methods are given for example in JP-A Nos. 63-113576 and 05-341666. It is particularly preferred to use an intermediate transfer belt in the heat assistance transfer method. Also, it is preferred to provide a cooling device for the intermediate belt after toner transfer or in the latter half of transfer to the electrophotographic image-receiving sheet. Due to this cooling device, the toner (toner image) is cooled to the softening temperature of the binder resin or lower, or the glass transition temperature of the toner plus 10° C. or less, hence the image is transferred to the electrophotographic image-receiving sheet efficiently and can be separated away from the intermediate belt.

Fixing is an important step which influences the gloss and smoothness of the final image. The fixing method may be carried out by a heat and pressure roller, or belt fixing using a belt, but from the viewpoint of image quality such as gloss and smoothness, belt fixing is preferred. Belt fixing methods known in the art include for example an oil-less belt fixing described in JP-A No. 11-352819, and the method where secondary transfer and fixing are realized simultaneously described in JP-A Nos. 11-231671 and 05-341666. Further, a first fixing may also be performed by a heat roller before the pressurizing and heating by the fixing belt and fixing roller.

The surface of the fixing belt may receive a surface treatment of a silicone compound, fluorine compound or a combination thereof to prevent peeling of the toner and prevent offset of toner components. Also, it is preferred to provide a belt cooling device in the latter half of fixing, which improves the separation of the electrophotographic image-receiving sheet. The cooling temperature is preferably the softening point or lower, or the glass transition temperature plus 10° C. or lower, of the toner binder resin and/or the polymer in the toner image-receiving layer of the electrophotographic image-receiving sheet. On the other hand, in the first stage of fixing, the temperature of the toner image-receiving layer or toner on the electrophotographic image-receiving sheet must be raised to the temperature at which they become sufficiently softened. Specifically, it is preferred in practice that the cooling temperature is 30° C. to 70° C., and that it is 100° C. to 180° C. in the initial stage of fixing.

Hereafter, an example of the apparatus for image formation having a typical fixing belt will be described referring into FIGURE. It should however be understood that the present invention is not limited to the aspect shown in FIGURE.

First, a toner (12) is transferred onto an electrophotographic image-receiving sheet (1) by an apparatus for image formation, (which is not shown in FIGURE). The image-receiving sheet (1) to which the toner (12) adheres is transferred to a point A by a transferring equipment (which is not shown in FIGURE), and is transported between a heat roller (14) and pressure roller (15), and is thereby heated and pressurized to a temperature (fixing temperature) and to pressure at which a toner image-receiving layer of the electrophotographic image-receiving sheet (1), or the toner (12), are sufficiently softened.

Herein, the fixing temperature means the temperature of the toner image-receiving layer surface measured at the position of the heat roller (14), pressure roller (15) and nip part at the point A, and is for example 80° C. to 190° C., and more preferably 100° C. to 170° C. The pressure means the pressure of the toner image-receiving layer surface measured at the heat roller (14), pressure roller (15) and nip part, and is for example 1 $kg/cm^2$ to 10 $kg/cm^2$, and more preferably 2 $kg/cm^2$ to 7 $kg/cm^2$. While the electrophotographic image-receiving sheet (1) is thus heated and pressurized, and is transported to the cooling device (16) by a fixing belt (13), a releasing agent, (not shown in FIGURE) which was present dispersed in the toner image-receiving layer, is sufficiently heated so as to become melted, and is transferred onto a surface of the toner image-receiving layer. The transferred releasing agent forms a layer (film) of releasing agent on the surface of the toner image-receiving layer. Thereafter, the electrophotographic image-receiving sheet (1) is transported to the cooling device (16) with the fixing belt (13), and is cooled for example to the softening point of the binder resin or lower, or the glass transition temperature plus 10° C. or lower of the binder resin used in the polymer and/or toner on the toner image-receiving layer, which is preferably 20° C. to 80° C., and more preferably room temperature (25° C.). In this way, the layer (film) of releasing agent disposed on the surface of the toner image-receiving layer is cooled and solidified, and the layer of the releasing agent is disposed due to change in the releasing agent, inside the toner image-receiving layer.

The cooled electrophotographic image-receiving sheet (1) is then transported to the point B by the fixing belt (13), and the fixing belt (13) is spanned around and is rotated by a tension roller (17). Therefore, at the point B, the electrophotographic image-receiving sheet (1) and fixing belt (13) become separated. It is preferred to have a smaller diameter of the tension roller, so that the electrophotographic image-receiving sheet separates from the belt with its own rigidity (strength).

The fixing belt is preferably an endless belt comprising polyimide, electroforming nickel and alminium as a base material. A thin layer formed of at least one selected from silicone rubber, fluorine rubber, silicone resin, and fluorine resin is disposed on a surface of the fixing belt. Of these, it is preferred to dispose a layer of fluorocarbon siloxane rubber on the surface of the fixing belt, or to dispose a layer of silicone rubber on the surface of the fixing belt, and then to dispose a layer of fluorocarbon siloxane rubber on the surface of the layer of silicone rubber.

It is preferred that the fluorocarbon siloxane rubber has a perfluoroalkyl ether group and/or a perfluoroalkyl group in the main chain.

Examples of the fluorocarbon siloxane rubber include: (A) a fluorocarbon polymer having a fluorocarbon siloxane expressed by the following Formula 1 as its main component, and containing aliphatic unsaturated groups, (B) an organopolysiloxane and/or fluorocarbon siloxane containing two or more ≡SiH groups in one molecule, and 1 to 4 times more the molar amount of ≡SiH groups than the amount of aliphatic unsaturated groups in the fluorocarbon siloxane rubber, (C) a filler, and (D) an effective amount of catalyst.

The fluorocarbon polymer having (A) as a component comprises a fluorocarbon siloxane containing a repeated unit expressed by the following Formula 1 as its main component, and contains aliphatic unsaturated groups.

Formula 1

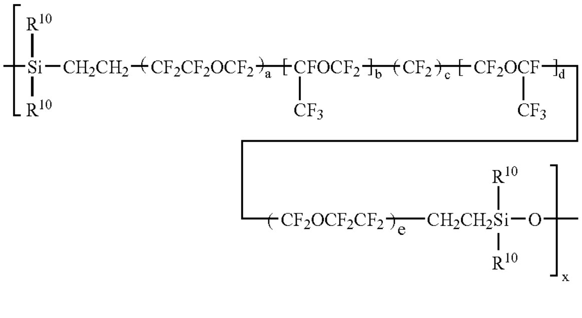

Herein, in the Formula 1, $R^{10}$ is a non-substituted or substituted monofunctional hydrocarbon group preferably containing 1 to 8 carbon atoms, preferably an alkyl group containing 1 to 8 carbon atoms or an alkenyl group containing 2 to 3 carbon atoms, and particularly preferably a methyl group. "a," and "e" are respectively 0 or 1; "b," and "d" are respectively an integer of 1 to 4, and "c" is an integer of 0 to 8. "x" is an integer of 1 or more, and preferably 10 to 30.

An example of this component (A) include a substance shown by the following Formula 2:

Formula 2

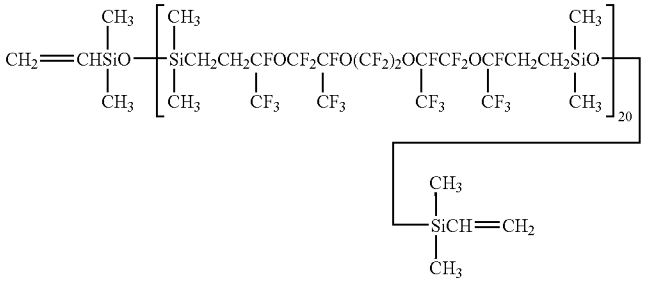

In Component (B), one example of the organopolysiloxane comprising ≡SiH groups is an organohydrogenpolysiloxane having at least two hydrogen atoms bonded to silicon atoms in the molecule.

In the fluorocarbon siloxane rubber composition, when the organocarbon polymer of Component (A) comprises an aliphatic unsaturated group, the organohydrogenpolysiloxane may be used as a curing agent. Namely, in this case, the cured product is formed by an addition reaction between aliphatic unsaturated groups in the fluorocarbon siloxane, and hydrogen atoms bonded to silicon atoms in the organohydrogenpolysiloxane.

Examples of these organohydrogenpolysiloxanes are the various organohydrogenpolysiloxanes used in an addition-curing silicone rubber composition.

It is generally preferred that the organohydrogenpolysiloxane is blended in such a proportion that the number of "≡SiH groups" therein is at least one, and particularly 1 to 5, relative to one aliphatic unsaturated hydrocarbon group in the fluorocarbon siloxane of Component (A).

It is preferred that in the fluorocarbon containing ≡SiH groups, one unit of the Formula 1 or $R^{10}$ in the Formula 1 is a dialkylhydrogensiloxane group, the terminal group is a ≡SiH group such as a dialkylhydrogensiloxane group, a silyl group, or the like. An example of the fluorocarbon includes those represented by the following Formula 3.

Examples of the catalyst, which is Component (D), include those any known as an addition reaction catalyst in the art. Specific examples of the catalyst include chloroplatinic acid, alcohol-modified chloroplatinic acid, complexes of chloroplatinic acid and olefins, platinum black or palladium supported on a support such as alumina, silica, carbon, or the like, and Group VIII elements of the Periodic Table or compounds thereof such as complexes of rhodium and olefins, chlorotris(triphenylphosphine) rhodium (an Wilkinson catalyst), rhodium (III) acetyl acetonate, or the like. It is preferred to dissolve these complexes in an alcohol solvent, an ether solvent, a hydrocarbon solvent, or the like.

Various blending agents may be added to the fluorocarbon siloxane rubber composition, to the extent that the blending agents do not interfere with the purpose of the present invention, which is to improve solvent resistance. For example, dispersing agents such as diphenylsilane diol, low polymer chain end hydroxyl group-blocked dimethylpolysiloxane, hexamethyl disilazane, heat resistance improvers such as ferrous oxide, ferric oxide, cerium oxide, octyl acid iron, or the like; and colorants such as pigments or the like, may be added as a compounding agent, if necessary.

The fixing belt is obtained by covering the surface of a heat resistant resin or metal belt with the fluorocarbon siloxane rubber composition, and heat and cure it. The composition may be diluted to form a coating solution with a solvent such as m-xylene hexafluoride, benzotrifluoride, or the like. The coating solution is then applied by an ordinary coating method such as spin coating, dip coating, knife coating, or the like. The heat curing temperature and time can be suitably selected. The heat curing temperature and time can be suitably selected within the ranges of 100° C. to Formula 3

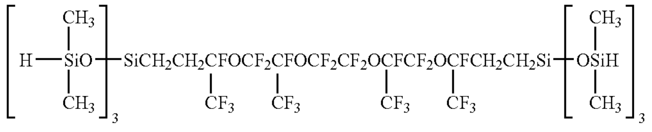

The filler, which is Component (C), may be various fillers used in ordinary silicone rubber compositions. Examples are reinforcing fillers such as mist silica, precipitated silica, carbon powder, titanium dioxide, aluminum oxide, quartz powder, talc, sericite, bentonite, or the like; fiber fillers such as asbestos, glass fiber, organic fibers or the like.

500° C. and 5 seconds to 5 hours, according to a type of the belt, a process for manufacturing the belt, or the like.

A thickness of the layer of fluorocarbon siloxane rubber is not particularly limited. The thickness is preferably 20 μm to 500 μm, and more preferably 40 μm to 200 μm, so as to obtain good fixing properties for an image, with preventing toner separation and offset of the toner at the same time.

The process for image formation to form an image on the electrophotographic image-receiving sheet is not limited to the process shown in FIGURE, as long as it is an electrophotographic process using a fixing belt. Hence, any of the ordinary electrophotographic methods may be used.

For example, a color image may suitably be formed on the electrophotographic image-receiving sheet. A color image can be formed, using an apparatus for electrophotography which permits forming a full color image. An ordinary apparatus for electrophotography comprises an image-receiving sheet transport part, latent image-forming part, and developing part disposed in the vicinity of the latent image-forming part. Depending on the type, it may also comprise, in the center of the apparatus, a toner image intermediate transfer part in the vicinity of a latent image-forming part and an image-receiving sheet transport part.

To improve image quality, adhesive transfer or heat assistance transfer methods may be used, instead of electrostatic transfer, bias roller transfer, or in combination of the heat assistance transfer methods, the electrostatic transfer, and/or bias roller transfer. The detailed structures are described, for example, in JP-A Nos. 63-113576 and 05-341666. The intermediate transfer belt in the heat assistance transfer method is particularly preferred when small particle diameter toner is used.

According to the process for image formation of the present invention, separation of the electrophotographic image-receiving sheet and toner or offset of the electrophotographic image-receiving sheet and toners can be prevented, even if an oilless machine providing no fixing oil is used. A stable paper provision can be realized, and a good image with more gloss than ever, and a plenty of photographic features, can be obtained.

The present invention will now be described referring to the detailed examples, but it should be understood that the present invention is not limited to the following Examples.

EXAMPLE 1

Manufacture of Support

A high quality paper of weighting 160 (g/m$^2$) was used as raw paper.

A blended product, in which high-density polyethylene (HDPE) and low density polyethylene (LDPE) were mixed in a mass ratio of 7/3, was provided on a back surface of the raw paper by extrusion coating, so as to have a melting point of 310° C. As a result, a back PE layer having a thickness of 15 μm was obtained on the back surface of the raw paper.

LDEP was provided on a top surface of the raw paper by extrusion coating. As a result, a top PE layer having a thickness of 31.7 μm was obtained on the top surface of the raw paper. Polyethylene laminated paper was manufactured as a support. The light transmittance of the support was 12.1% when measured by a direct haze meter (HGM-2DP produced by Suga Test Instruments).

Formation of Top Surface Undercoat Layer

The following composition was coated by a wire coater on the top surface of the support, and then dried, so that the coating amount after drying was 0.1 (g/m$^2$). As a result, a top surface undercoat layer was disposed on the top surface of the support.

Top surface undercoat layer composition

| | |
|---|---|
| Gelatin | 5 parts by mass |
| Water | 95 parts by mass |

Formation of Backing layer

The following composition was coated by a wire coater on back surface of the support and then dried, so that the coating amount after drying was 8.2 (g/m$^2$).

Backing layer composition

| | |
|---|---|
| Aqueous acrylic resin (High-Loss XBH-997L (solids 28.3% by mass) produced by SEIKO CHEMICAL INDUSTRIES CO., LTD.) | 100 parts by mass |
| Paraffin wax (Hydrine D-337 (solids 30% by mass) produced by Chukyo Oil and Fats, Co., Ltd.) | 4.5 parts by mass |
| Ion exchange water | 33 parts by mass |

Formation of intermediate layer

The following intermediate layer composition was coated by a wire coater on the top surface of the support, so that thickness coated after drying was 5 μm.

Intermediate layer composition

| | |
|---|---|
| Water-dispersible acrylic resin (High-Loss HE-1335 (solids 45% by mass) produced by SEIKO CHEMICAL INDUSTRIES CO., LTD.) | 100 parts by mass |
| Surfactant (Rapisol B-90 (solids 10% by mass) produced by NOF CORPORATION) | 2 parts by mass |
| Ion exchange water | 30 parts by mass |

Formation of toner image-receiving layer

The following toner image-receiving layer composition was coated by a wire coater onto the intermediate layer and dried, so that the thickness after drying was 10 μm, and the amounts (g/m$^2$) of wax and a white pigment in the toner image-receiving layer became as shown in Table 1. As a result, an electrophotographic image-receiving sheet was manufactured. When a 10 μm thick coating film was separately disposed on a polyethylene terephthalate film (100 μm) and the light transmittance of the coating film was measured using a direct haze meter (HGM-2DP produced by Suga Test Instruments), it was found to be 60.0%.

Toner image-receiving layer composition

| | |
|---|---|
| Water-dispersible polyester resin (Elitel KZA-1449 (solids 30% by mass)), flow start temperature (100.4 (° C.) produced by Unitika Ltd.) | 100 parts by mass |
| Releasing agent in Table 1 (see Table 2) | 5 parts by mass |
| White pigment ($TiO_2$) water dispersion (see Table 3) | 7.5 parts by mass |

<Evaluation>

An image was formed on a surface of an electrophotographic image-receiving sheet manufactured according to the above-mentioned Example 1 using a fixing belt electrophotographic device, and anti-offset properties, glossiness, whiteness index, resistance to cracks and adhesion resistance were measured.

As printed images, a white solid fills, gray (R=G=B=50% of image), black (100%) and a female portrait image were used. As the apparatus for electrophotography, a Fuji Xerox Co., Ltd.'s color laser printer (C-2220) was used except that the apparatus had a fixing belt described below.

Regarding a base material for the fixing belt, DY39-115 (produced by Dow Corning Toray Silicone Co., Ltd.), which is a primer for silicone rubber, was coated on a base layer as a base material for a fixing belt. After 30 minute air drying, a coating film which was obtained by dipcoating a coating solution in which 100 parts by mass of a precursor, DY35-796AB, and 30 parts by mass of n-hexane were prepared, and then primarily cured at 120° C. for 10 minutes. As a result, a layer of silicone rubber having a thickness of 40 μm was obtained.

A coating film obtained by dipcoating a coating solution in which 100 parts by mass of a fluorocarbon siloxane rubber precursor, SIFEL610 (produced by Shin-Etsu Chemical Co., Ltd.), and 20 parts by weight of fluorine solvent (a mixed solvent of m-xylene hexafluoride, perphloroalkane, and perphloro(2-butyltetrahydrofuran) were prepared. Thereafter, the coating film was disposed on the layer of silicone rubber, was then primarily cured at 120° C. for 10 minutes, and secondly cured at 180° C. for 4 hours. As a result, a fixing belt which has a layer of fluorocarbon siloxane rubber having a thickness of 20 μm on the layer of silicone rubber was obtained.

Printing speed of the printer was basically set to 30 mm/second. The fixing temperature of toners was referred to as a temperature of a heating roller of 155° C. and a temperature of a pressurizing roller of 130° C. The device for electrophotography which had the printing speed and the fixing temperature was used.

Each of the white solid fills, gray, black (100%) and a female portrait image was transferred onto the electrophotographic image-receiving sheet.

<<Anti-offset Properties>>

The above-mentioned electrophotographic image-receiving sheet was transported through a color laser printer C-2220 (oil-less fixing technique) produced by Fuji Xerox Co., Ltd., in an environment of 30° C. and 80%RH. The following evaluation criteria were used to estimate whether a shell-like unevenness occurred on a surface of the image when the image receiving sheet was transported through the fixing part in an ordinary way. The results are shown in Table 4. In the present invention, "○" or higher is the level permitted in practice.

◎: conchoidal unevenness did not occur at all.

○: although conchoidal unevenness occurred very slightly, it was not at a level which caused a problem in practice.

Δ: some conchoidal unevenness.

X: severe conchoidal unevenness.

<<Transport Properties>>

100 of the above electrophotographic image-receiving sheets were continuously supplied using the above printer, and the sum total of sheets with feed defects, jamming and poor lamination was counted. The results are shown in Table 4. In the present invention, "2 sheets or less" is the level permitted in practice.

<<Glossiness>>

10 $cm^2$ images were formed on the above-mentioned electrophotographic image-receiving sheet in six densities (0%, 20%, 40%, 60%, 80%, and 100%) under B/W conditions using the printer. The images formed were measured at 20 degrees by a digital deflection gloss meter (UGV-5 g produced by Suga Test Instruments) according to JIS Z 8741, and the minimum value was recorded. The results are shown in Table 4. In the present invention, "75 or more" is the level permitted in practice.

<<Whiteness>>

The ratio (%) of the reflectance when irradiating a light having a color between blue and violaceous to a sample electrophotographic image-receiving sheet in the spectrum, to other reflectance obtained when irradiating the same light to a standard magnesium oxide plate, was measured using a Hunter white chromoscope according to the method specified to in JIS P8123. The results are shown in Table 4. In the present invention, "85% or more" is the level permitted in practice.

<<Resistance to Cracks>>

After forming black images of a uniform 10 $cm^2$ at maximum density on the above-mentioned electrophotographic image-receiving sheet using the printer, they were left in an environment at 10° C., and at 15%RH for one day. Then, bars of 1 cm, 2 cm, 3 cm, 4 cm, and 5 cm diameters were prepared, the electrophotographic image-receiving sheet was wound around each of the bars starting from the bar having a large diameter, so that the surface on which an image was formed appeared outside the sheet, and the minimum diameter at which cracks did not appear was recorded. The results are shown in Table 4. In the present invention, "3 cm or less" is the level permitted in practice.

<<Adhesion Resistance >>

After storing the electrophotographic image-receiving sheets at 40° C., and at 80%RH for 24 hours, the electrophotographic image-receiving sheets were superimposed each other, so that the toner image-receiving layers of the sheets were facing each other. In addition, a 3.5 $cm^2$, 500 g load was placed on the sheets, and the sheets were left for 7 days in the same environment. The following criteria was given to evaluate a state of separation when the sheets were separated from each other. The results are shown in Table 4. In the present invention, "2 or less" is the level permitted in practice.

[Evaluation Criteria]

1: No separation sound or trace of adhesion of the sheets

2: Slight separation sound or slight trace of adhesion remains on the sheets

3: Remaining adhesion is less than ¼ of the sheet

4: ¼ or more and less than ½ of the sheet adhere each other

5: ½ or more of the sheet adhere each other

EXAMPLES 2–5, EXAMPLES 10–14, COMPARATIVE EXAMPLES 1–18)

The electrophotographic image-receiving sheets of Examples 2–5, Examples 10–14 and Comparative Examples 1–18 were manufactured in the same way as in Example 1, except that the conditions (blending components, blending amounts, materials used, or the like) were suitably changed to obtain the compositions listed in Table 1 (each of the columns and rows refers to Examples 2–5, Examples 10–14 and Comparative Examples 1–18).

EXAMPLES 6–7

An electrophotographic image-receiving sheet was manufactured by forming a support, a top surface undercoat layer, a backing layer and an intermediate layer, and forming a toner image-receiving layer by coating the following toner image-receiving composition with a wire coater to the intermediate layer and drying, so that the thickness after drying was 10 μm. The amount ($g/m^2$) of wax and white pigment in the toner image-receiving layer were shown in Table 1.

| | |
|---|---|
| Toner image-receiving layer composition | |
| Water-dispersible polyester resin (Elitel KZA-1449 (solids 30% by mass), produced by Unitika Ltd. flow start temperature (100.4° C.) | 100 parts by mass |
| Releasing agent in Table 1 (see Table 2 for details) | "x" parts by mass |
| White pigment (hollow particle) water dispersion (see Table 3 for details) | 11 parts by mass |

""x" parts by mass" is a blending amount set so that the releasing agent amount is the coating amount (g/$m^2$) in Table 1 corresponding to the solids (% by mass) of releasing agent (see Table 3 for details).

EXAMPLES 8–9

An electrophotographic image-receiving sheet was manufactured by forming a support, top surface undercoat layer, backing layer and intermediate layer, and forming a toner image-receiving layer by applying the following toner image-receiving composition with a wire coater to the intermediate layer and drying, so that the thickness after drying was 10 μm. The amount (g/$m^2$) of wax and white pigment in the toner image-receiving layer were shown in Table 1.

| | |
|---|---|
| Toner image-receiving layer composition | |
| Solvent polyester resin | 100 parts by mass |
| (Toughtone U-5, produced by Kao Corporation (solids 100%, flow start temperature: 108.1° C.)) | |
| Releasing agent in Table 1 (see Table 2) | "y" parts by mass |
| White pigment dispersion | 2.5 parts by mass |
| ($TiO_2$MEK (methyl ethyl ketone) dispersion (see Table 3 for details)) | |
| Methyl ethyl ketone (MEK) | 160 parts by mass |

""y" parts by mass" is a blending amount set so that the releasing agent amount is the coating amount (g/$m^2$) in Table 1 corresponding to the solids (% by mass) of releasing agent (see Table 3 for details).

In Table 1, "*high quality paper" is high quality paper of weighting 160 (g/$m^2$).

TABLE 2

| No. | Releasing agent; Type (commercially available from Chukyo Oils and Fats Co., Ltd.) | Solids (% by mass) | Particle diameter (μm) | Melting point (° C.) |
|---|---|---|---|---|
| A | Paraffin wax (Cellosol 428) | 50 | 0.5 | 48 |
| B | Paraffin wax (Hydrin P7) | 30 | 0.85 | 55 |
| C | Paraffin wax (Hydrin D336) | 30 | 0.85 | 63 |
| D | Paraffin wax (Hydrin D337) | 30 | 0.85 | 68 |
| E | Stearic acid (Cellosol 920) | 30 | — | 70 |
| F | Microcrystalline wax acid (Cellosol 967) | 50 | — | 74 |
| G | Paraffin wax (Hydrin D338) | 30 | 0.85 | 74 |
| H | Hard montan wax | 35 | — | 80 |
| I | Carnauba wax (Cellosol 524) | 30 | 0.1 | 83 |
| J | Methylol stearoamide (Hydrin D757) | 21.5 | 3.5 | 100 |
| K | Stearic acid amide (Himicron G270) | 21.5 | 0.5 | 100 |
| L | Methylol stearoamide (Hydrin D130) | 22 | — | 110 |
| M | Zn stearate (Himicron Z-7-30) | 30 | 5.5 | 120 |
| N | Zn stearate (Himicron F930) | 40 | 0.9 | 120 |
| O | Zn stearate (Hydrin F115) | 20 | 0.15 | 120 |
| P | Ethylene-bis-stearoamide (Cellusol B495) | 43 | 6 | 140 |
| Q | Ethylene-bis-stearoamide (Himicron G110) | 27.5 | 0.5 | 140 |

TABLE 1

| Examples, and Comparative Examples | Support: Material | Support: Light transmittance (%) | Toner image-receiving layer: Thermoplastic resin | Pigment: Type | Pigment: Amount (g/$m^2$) | Releasing agent: Type (see Table 2) | Releasing agent: Amount (g/$m^2$) | Light transmittance (%) | Thickness (μm) |
|---|---|---|---|---|---|---|---|---|---|
| Example 1 | PE laminated | 12.1 | KZA-1449 | $TiO_2$ | 1.0 | I | 0.5 | 60.0 | 10 |
| Example 2 | paper | | aqueous type | | | H | | | |
| Example 3 | | | | | | I | 0.1 | | |
| Example 4 | | | | | | I | 2.5 | | |
| Example 5 | | | | | | I | 5 | | |
| Example 6 | | | | hollow | | H | 0.5 | 70.5 | |
| Example 7 | | | | particles | | I | | | |
| Example 8 | | | U-5 solvent type | $TiO_2$ | | H | | 60.0 | |
| Example 9 | | | | | | I | | | |
| Example 10 | *High quality | 15.2 | KZA-1449 | | | H | | | |
| Example 11 | paper | | aqueous type | | | I | | | |
| Example 12 | PE laminated | 12.1 | | | | E | | | |
| Example 13 | paper | | | | | F | | | |
| Example 14 | | | | | | G | | | |
| Comp. Ex. 1 | | | | | | A | | | |
| Comp. Ex. 2 | | | | | | B | | | |
| Comp. Ex. 3 | | | | | | C | | | |
| Comp. Ex. 4 | | | | | | D | | | |
| Comp. Ex. 5 | | | | | | J | | | |
| Comp. Ex. 6 | | | | | | K | | | |
| Comp. Ex. 7 | | | | | | L | | | |
| Comp. Ex. 8 | | | | | | M | | | |
| Comp. Ex. 9 | | | | | | N | | | |
| Comp. Ex. 10 | | | | | | O | | | |
| Comp. Ex. 11 | | | | | | P | | | |
| Comp. Ex. 12 | | | | | | Q | | | |
| Comp. Ex. 13 | | | | | | — | none | | |
| Comp. Ex. 14 | | | | none | 0 | C | 0.5 | 93.0 | |
| Comp. Ex. 15 | | | | | | D | | | |
| Comp. Ex. 16 | | | | | | I | | | |
| Comp. Ex. 17 | | | | | | J | | | |
| Comp. Ex. 18 | | | | | | M | | | |

TABLE 3

| | Manufacturer | Commercially available name | Composition | Voids (%) | Average particle diameter (μm) | Solids (%) |
|---|---|---|---|---|---|---|
| $TiO_2$ aqueous dispersion | Fuji Photo Film Co., Ltd. | Aqueous dispersion made from $TiO_2$ (Tipec R780-2 (ISHIHARA SANGYO KAISHA, LTD.)) and polymer dispersant | $TiO_2$/dispersant | 0 | 0.3 | $TiO_2$ proportion = 40 |
| $TiO_2$ MEK dispersion | Fuji Photo Film Co., Ltd. | Aqueous dispersion made from $TiO_2$ (Tipec A-220 (ISHIHARA SANGYO KAISHA, LTD.)), polyester resin and MEK | $TiO_2$/dispersant | 0 | 0.3 | $TiO_2$ proportion = 40 |
| Hollow particle aqueous dispersion | Rohm and Haus Co., Ltd. | Ropec HP-1055 | Styrene acrylic | 55 | 1 | 26.5 |

TABLE 4

| | Evaluation | | | | | |
|---|---|---|---|---|---|---|
| | Machine compatibility | | | | Handling properties | |
| | | Transport | Image quality | | Resistance | |
| | Anti-offset properties | properties (sheet(s)) | Gloss | Whiteness (%) | to cracks (φ) | Adhesion resistance |
| Example 1 | ⊚ | 0 | 82 | 90 | 2 | 2 |
| Example 2 | ⊚ | 0 | 83 | 91 | 2 | 2 |
| Example 3 | ○ | 2 | 79 | 90 | 3 | 2 |
| Example 4 | ⊚ | 0 | 75 | 90 | 1 | 1 |
| Example 5 | ⊚ | 0 | 65 | 90 | 1 | 1 |
| Example 6 | ⊚ | 0 | 82 | 91 | 2 | 2 |
| Example 7 | ⊚ | 0 | 82 | 91 | 2 | 2 |
| Example 8 | ⊚ | 0 | 84 | 91 | 2 | 1 |
| Example 9 | ⊚ | 0 | 84 | 91 | 2 | 1 |
| Example 10 | ⊚ | 0 | 79 | 88 | 3 | 1 |
| Example 11 | ⊚ | 0 | 79 | 88 | 3 | 1 |
| Example 12 | ○ | 2 | 79 | 90 | 3 | 2 |
| Example 13 | ○ | 2 | 81 | 90 | 3 | 2 |
| Example 14 | ○ | 1 | 81 | 90 | 3 | 2 |
| Comp. Ex. 1 | Δ | 8 | 72 | 90 | 4 | 4 |
| Comp. Ex. 2 | Δ | 8 | 73 | 90 | 4 | 3 |
| Comp. Ex. 3 | Δ | 10 | 78 | 91 | 4 | 2 |
| Comp. Ex. 4 | Δ | 5 | 80 | 90 | 4 | 2 |
| Comp. Ex. 5 | Δ | 4 | 84 | 90 | 2 | 2 |
| Comp. Ex. 6 | Δ | 4 | 85 | 90 | 2 | 2 |
| Comp. Ex. 7 | x | — | — | 90 | 2 | 3 |
| Comp. Ex. 8 | x | — | — | 90 | 2 | 4 |
| Comp. Ex. 9 | x | — | — | 90 | 2 | 4 |
| Comp. Ex. 10 | x | — | — | 90 | 2 | 5 |
| Comp. Ex. 11 | x | — | — | 90 | 1 | 5 |
| Comp. Ex. 12 | x | — | — | 90 | 1 | 5 |
| Comp. Ex. 13 | x | — | — | 90 | 4 | 4 |
| Comp. Ex. 14 | Δ | 1 | 79 | 82 | 3 | 2 |
| Comp. Ex. 15 | Δ | 2 | 80 | 82 | 3 | 2 |
| Comp. Ex. 16 | ○ | 0 | 84 | 82 | 2 | 1 |
| Comp. Ex. 17 | Δ | 2 | 84 | 82 | 2 | 2 |
| Comp. Ex. 18 | Δ | 10 | 76 | 82 | 2 | 4 |

All samples were printed by a commercial color laser printer, specifically, a full color laser printer produced by Fuji Xerox Co., Ltd. (DCC-400CP/320CP, DCC-500CP), and the same results as those of Table 4 were obtained.

According to the present invention, an electrophotographic image-receiving sheet having excellent anti-offset properties, adhesion resistance, paper transport properties and gloss, and being resistant to cracks and able to form a high quality image can be provided. The electrophotographic image-receiving sheet of the present invention includes a toner image-receiving layer and a support disposed on the toner image-receiving layer, in which the toner image-receiving layer contains a thermoplastic resin and natural wax, the toner image-receiving layer has a light transmittance of 78% or less, and the support has a light transmittance of 30% or less.

What is claimed is:

1. An electrophotographic image-receiving sheet comprising:

a support; and a toner image-receiving layer disposed on the support, wherein the toner image-receiving layer contains a thermoplastic resin, a natural wax, and a pigment; the toner image-receiving layer has a light transmittance of 78% or less; the support has a light transmittance of 30% or less; and the pigment is in the form of hollow particles;

and further wherein the toner image-receiving layer receives toners, the toners contain a binder resin and a colorant, the toners have an average particle diameter of 0.5 μm to 10 μm, the volume average particle size distribution index (GSDv) of the toners is 1.3 or less; the toners have a volume average particle diameter of 0.5 μm to 10 μm, and the average value of a formation coefficient of the toners expressed by the following formula is 1.00 to 1.50:

$$\text{Formation coefficient}=(\pi\times L^2)/(4\times S)$$

where "L" expresses a maximum length of one of the toners, and "S" expresses a projected area of one of the toners.

2. An electrophotographic image-receiving sheet according to claim 1, wherein the natural wax is any wax selected from vegetable wax, mineral wax and petroleum wax.

3. An electrophotographic image-receiving sheet according to claim 2, wherein the vegetable wax is carnauba wax having a melting point of 70° C. to 95° C.

4. An electrophotographic image-receiving sheet according to claim 2, wherein the mineral wax is montan wax having a melting point of 70° C. to 95° C.

5. An electrophotographic image-receiving sheet according to claim 1, wherein the natural wax is water-dispersible wax.

6. An electrophotographic image-receiving sheet according to claim 1, wherein the toner image-receiving layer contains 0.1 $g/m^2$ to 4 $g/m^2$ of the natural wax.

7. An electrophotographic image-receiving sheet according to claim 1, wherein the toner image-receiving layer further contains a colorant.

8. An electrophotographic image-receiving sheet according to claim 1, wherein the pigment is a white pigment.

9. An electrophotographic image-receiving sheet according to claim 1, wherein the pigment is titanium dioxide.

10. An electrophotographic image-receiving sheet according to claim 1, wherein the toner image-receiving layer contains the pigment and the natural wax in a content ratio (the pigment/the natural wax) of 0.1/2 to 8/0.1.

11. An electrophotographic image-receiving sheet according to claim 1, wherein the thermoplastic resin is at least one of a water-soluble thermoplastic resin and a water-dispersible thermoplastic resin.

12. An electrophotographic image-receiving sheet according to claim 1, wherein the thermoplastic resin is self-dispersing water-dispersible polyester resin emulsion, which satisfies the following properties (1) to (4):

(1) Number average molecular weight (Mn)=5000 to 10000

(2) Molecular weight distribution (weight average molecular weight/number average molecular weight) ≦4

(3) Glass transition temperature (Tg)=40° C. to 100° C.

(4) Volume average particle diameter=20 nm to 200 nm.

13. An electrophotographic image-receiving sheet according to claim 1, wherein the support is selected from raw paper, synthetic paper, a synthetic resin sheet, coated paper, and laminated paper.

14. An electrophotographic image-receiving sheet according to claim 1, wherein a ratio (GSDv/GSDn) of the volume average particle size distribution index (GSDv) and a number average particle size distribution index (GSDn) of the toners is 0.95 or more.

15. An electrophotographic image-receiving sheet according to claim 1, wherein the toners are manufactured by a process comprising the steps of:

(i) forming aggregated particles in a dispersion in which resin particles are dispersed, so as to prepare aggregated particle dispersion;

(ii) adding and mixing a fine particle dispersion in which fine particles are dispersed, into the aggregated particle dispersion, so as to form adhesion particles in which the aggregated particles adhere to the fine particles; and (iii) heating and fusing the adhesion particles, so as to form toners.

16. An electrophotographic image-receiving sheet comprising:

a support; and a toner image-receiving layer disposed on the support, wherein the toner image-receiving layer contains a thermoplastic resin, a releasing agent having a melting point of 70° C. to 95° C., and a pigment, wherein the toner image-receiving layer has a light transmittance of 78% or less; the support has a light transmittance of 30% or less; and the pigment is in the form of hollow particles;

and further wherein the toner image-receiving layer receives toners, the toners contain a binder resin and a colorant, the toners have an average particle diameter of 0.5 μm to 10 μm, the volume average particle size distribution index (GSDv) of the toners is 1.3 or less; the toners have a volume average particle diameter of 0.5 μm to 10 μm, and the average value of a formation coefficient of the toners expressed by the following formula is 1.00 to 1.50:

$$\text{Formation coefficient}=(\pi\times L^2)/(4\times S)$$

where "L" expresses a maximum length of one of the toners, and "S" expresses a projected area of one of the toners.

17. An electrophotographic image-receiving sheet according to claim 16, wherein the releasing agent is at least one releasing agent selected from a silicone compound, a fluorine compound, any wax excluding natural wax, and a matting agent.

18. A process for image formation comprising the steps of:

forming a toner image on a surface of an electrophotographic image-receiving sheet;

heating and pressurizing the surface of the electrophotographic image-receiving sheet with a fixing belt and a roller; and cooling the surface, so as to separate the surface from the fixing belt, wherein the electrophotographic image-receiving sheet comprises:

a support; and a toner image-receiving layer disposed on the support, wherein the toner image-receiving layer contains a thermoplastic resin, a natural wax, and a pigment, wherein the toner image-receiving layer has a light transmittance of 78% or less; the support has a light transmittance of 30% or less; and the pigment is in the form of hollow particles;

and further wherein the toner image-receiving layer receives toners, the toners contain a binder resin and a colorant, the toners have an average particle diameter of 0.5 μm to 10 μm, the volume average particle size distribution index (GSDv) of the toners is 1.3 or less; the toners have a volume average particle diameter of 0.5 μm, to 10 μm, and the average value of a formation coefficient of the toners expressed by the following formula is 1.00 to 1.50:

$$\text{Formation coefficient}=(\pi\times L^2)/(4\times S)$$

where "L" expresses a maximum length of one of the toners, and "S" expresses a projected area of one of the toners.

19. A process for image formation according to claim 18, further comprising the step of:

fixing the toner image, wherein the step of fixing is carried out by a heating roller, and between the step of forming and the step of heating and pressurizing.

20. A process for image formation according to claim 18, wherein the step of cooling is carried out by cooling the toner image to one of a melting point or lower of a binder resin contained in a toner of the toner image, and a glass transition temperature plus 10° C. or lower of the binder resin.

21. A process for image formation according to claim 18, wherein the fixing belt has a layer of fluorocarbon siloxane rubber on a surface thereof.

22. A process for image formation according to claim 21, wherein the fluorocarbon siloxane rubber has at least one of a perfluoroalkylether group and a perfluoroalkyl group in a main chain thereof.

23. A process for image formation according to claim 18, wherein the fixing belt has a layer of silicone rubber on a surface thereof, and a layer of fluorocarbon siloxane rubber on the layer of silicone rubber.

24. A process for image formation according to claim 23, wherein the fluorocarbon siloxane rubber has at least one of a perfluoroalkylether group and a perfluoroalkyl group in a main chain thereof.

* * * * *